United States Patent
Amano et al.

(10) Patent No.: US 7,328,102 B2
(45) Date of Patent: Feb. 5, 2008

(54) NAVIGATION INTERVENTION APPARATUS, INTERVENTION METHOD AND VEHICLE NAVIGATION SYSTEM

(75) Inventors: Hiroshi Amano, Tokyo (JP); Takeshi Ota, Kanagawa (JP); Takumi Arie, Kanagawa (JP)

(73) Assignee: Sony Corporation (JP)

( * ) Notice: Subject to any disclaimer, the term of this patent is extended or adjusted under 35 U.S.C. 154(b) by 214 days.

(21) Appl. No.: 11/311,802

(22) Filed: Dec. 19, 2005

(65) Prior Publication Data

US 2006/0149469 A1    Jul. 6, 2006

(30) Foreign Application Priority Data

Dec. 20, 2004    (JP)    ............................. 2004-368326

(51) Int. Cl.
*G01C 21/36*    (2006.01)
(52) U.S. Cl. ..................... 701/211; 701/200; 340/995.1
(58) Field of Classification Search ................ 701/200, 701/208, 211; 340/995.1, 995.11, 995.14, 340/995.26, 995.27
See application file for complete search history.

(56) References Cited

U.S. PATENT DOCUMENTS

| 2002/0047900 A1* | 4/2002 | Nishiyama et al. .......... 348/148 |
| 2004/0105676 A1* | 6/2004 | Norizuki et al. .............. 398/68 |
| 2005/0104963 A1* | 5/2005 | Nishiyama et al. .......... 348/148 |
| 2006/0167629 A1* | 7/2006 | Ishii et al. .................. 701/211 |

* cited by examiner

*Primary Examiner*—Gary Chin
(74) *Attorney, Agent, or Firm*—Lerner, David, Littenberg, Krumholz & Mentlik, LLP

(57) ABSTRACT

The present invention allows an existing single-sequentialized navigation main unit to be virtually multi-sequentialized with simple structure. An intervention device 3 receives from a front monitor 4 and a rear monitor 5 acquisition requests which request various kinds of screens from a navigation main unit 2. In response to the acquisition requests, the intervention device 3 performs a mediating process or an adjusting process for various kinds of screens which are received from the navigation main unit 2 and are scheduled to be output to the front monitor 4 and the rear monitor 5. Therefore, even if the intervention device 3 receives a plurality of acquisition requests from the front monitor 4 and the rear monitor 5, the intervention device 3 can sequentially send the acquisition requests one by one to the navigation main unit 2. Accordingly, this allows the navigation main unit 2 to be virtually multi-sequentialized.

9 Claims, 17 Drawing Sheets

NAVIGATION INTERVENTION APPARATUS, INTERVENTION METHOD AND VEHICLE NAVIGATION SYSTEM

CROSS-REFERENCES TO RELATED APPLICATIONS

The present invention contains subject matter related to Japanese Patent Application JP2004-368326 filed in the Japanese Patent Office on Dec. 20, 2004, the entire contents of which being incorporated herein by reference.

BACKGROUND OF THE INVENTION

The present invention relates to a navigation intervention apparatus, intervention method and in-car navigation system, and is preferably applied to a vehicle navigation system in which a rear monitor is additionally connected to a system including a navigation main unit and a main monitor, for example.

A vehicle navigation systems have been mainly provided for the use of drivers. Therefore, the in-car navigation system typically has only one input/output device such as a front monitor connected to a navigation main unit. However, the recent model of in-car navigation system, in which a rear monitor is additionally connected to the car interior space to which a front monitor has been connected, becomes increasingly the norm, since cars have grown in size, the processing speed of computers has increased, and the like.

The vehicle navigation system which includes the front monitor and the additionally connected rear monitor is capable of outputting two kinds of processing results. That is to say, the vehicle navigation system can playback a Digital Versatile Disc (DVD) on the rear monitor, while performing car-navigation on the front monitor, for example.

With the vehicle navigation system, a rear-seat user may require a function by which he/she can use navigation on the rear monitor to find routes different from the ones used by a driver and he/she can display them.

To satisfy the requirement, a system has been provided in which a user can wirelessly connect an in-car portable terminal instead of a rear monitor to a car navigation system and can display the same information as the one displayed on the car navigation system or the information different from it on the vehicle portable terminal (Japanese Patent Laid-Open No. 2004-28909)

SUMMARY OF THE INVENTION

However, the above-noted in-car navigation system is mainly provided for the use of drivers. Therefore, the vehicle navigation system is typically set to single-sequence in which the navigation main unit accepts commands only from the front monitor to perform navigation processes, and is not set to multi-sequence in which the navigation main unit also accepts different commands from the additionally connected rear monitor to perform navigation processes.

Accordingly, it is contemplated to provide the vehicle navigation system with a plurality of processing engines allowing multi-sequence. However, in this case, there is a problem that the mechanism of the vehicle navigation system can be as complex as the system in which users have to set up a plurality of navigation devices.

The present invention has been made in view of the above points and is intended to provide a navigation intervention apparatus, intervention method and in-car navigation system which allow an existing single-sequentialized navigation main unit to be virtually multi-sequentialized with simple structure.

According to an embodiment of the present invention, there is provided a navigation intervention apparatus including; request reception means for receiving acquisition requests from a plurality of input/output sections, the acquisition requests requesting various kinds of screens from a navigation processing section, each of the input/output sections including a display section; intervention means for performing a mediating process or an adjusting process for the various kinds of screens in response to the acquisition requests, the various kinds of screens being received from the navigation processing section and being scheduled to be output to the plurality of input/output sections; and output means for outputting to the plurality of input/output sections the various kinds of screens for which the intervention means performed the mediating process or the adjusting process.

The navigation intervention apparatus performs the mediating process or the adjusting process between the navigation processing section and the plurality of input/output sections when receiving from the plurality of input/output sections the acquisition requests requesting various kinds of screens from the navigation processing section. Therefore, it can sequentially send the acquisition requests to the navigation processing section as if only one of the input/output sections does. This allows the single-sequentialized navigation processing section to be virtually multi-sequentialized.

Also, according to an embodiment of the present invention, there is provided an intervention method including; a request reception step of receiving acquisition requests from a plurality of input/output sections, the acquisition requests requesting various kinds of screens from a navigation processing section, each of the input/output sections including a display section; a intervention step of performing a mediating process or an adjusting process for the various kinds of screens in response to the acquisition requests, the various kinds of screens being received from the navigation processing section and being scheduled to be output to the plurality of input/output sections; and an output step of outputting to the plurality of input/output sections the various kinds of screens for which the intervention step performed the mediating process or the adjusting process.

The intervention method performs the mediating process or the adjusting process between the navigation processing section and the plurality of input/output sections when receiving from the plurality of input/output sections the acquisition requests requesting various kinds of screens from the navigation processing section. Therefore, it can sequentially send the acquisition requests to the navigation processing section as if only one of the input/output sections does. This allows the single-sequentialized navigation processing section to be virtually multi-sequentialized.

Also, according to an embodiment of the present invention, there is provided a vehicle navigation system including; a navigation processing section for performing a navigation process; a plurality of input/output sections coupled to the navigation processing section, each of the input/output sections including a display section; and an intervention section intervening between the navigation processing section and the plurality of input/output sections, wherein the intervention section receives from the plurality of input/output sections acquisition requests requesting various kinds of screens from the navigation processing section, performs a mediating process or an adjusting process in response to the acquisition requests for the various kinds of screens which is received from the navigation processing section and is scheduled to be output to the plurality of input/output sections, and then outputs the various kinds of screens to the plurality of input/output sections.

In the vehicle navigation system, the intervention section performs the mediating process or the adjusting process between the navigation processing section and the plurality of input/output sections when receiving from the plurality of input/output sections the acquisition requests requesting various kinds of screens from the navigation processing section. Therefore, it can sequentially send the acquisition requests to the navigation processing section as if only one of the input/output sections does. This allows the single-sequentialized navigation processing section to be virtually multi-sequentialized.

According to an embodiment of the present invention, the navigation intervention apparatus, intervention method and in-car navigation system perform the mediating process or the adjusting process between the navigation processing section and the plurality of input/output sections when receiving from the plurality of input/output sections the acquisition requests requesting various kinds of screens from the navigation processing section. Therefore, they can sequentially send the acquisition requests to the navigation processing section as if only one of the input/output sections does. Accordingly, there are provided the navigation intervention apparatus, intervention method and in-car navigation system which allow a single-sequentialized navigation processing section to be virtually multi-sequentialized.

The nature, principle and utility of the invention will become more apparent from the following detailed description when read in conjunction with the accompanying drawings in which like parts are designated by like reference numerals or characters.

DETAILED DESCRIPTION

An embodiment of the present invention will be described in detail with reference to the accompanying drawings.

(1) Overall Configuration of Vehicle Navigation System

Figure 1:
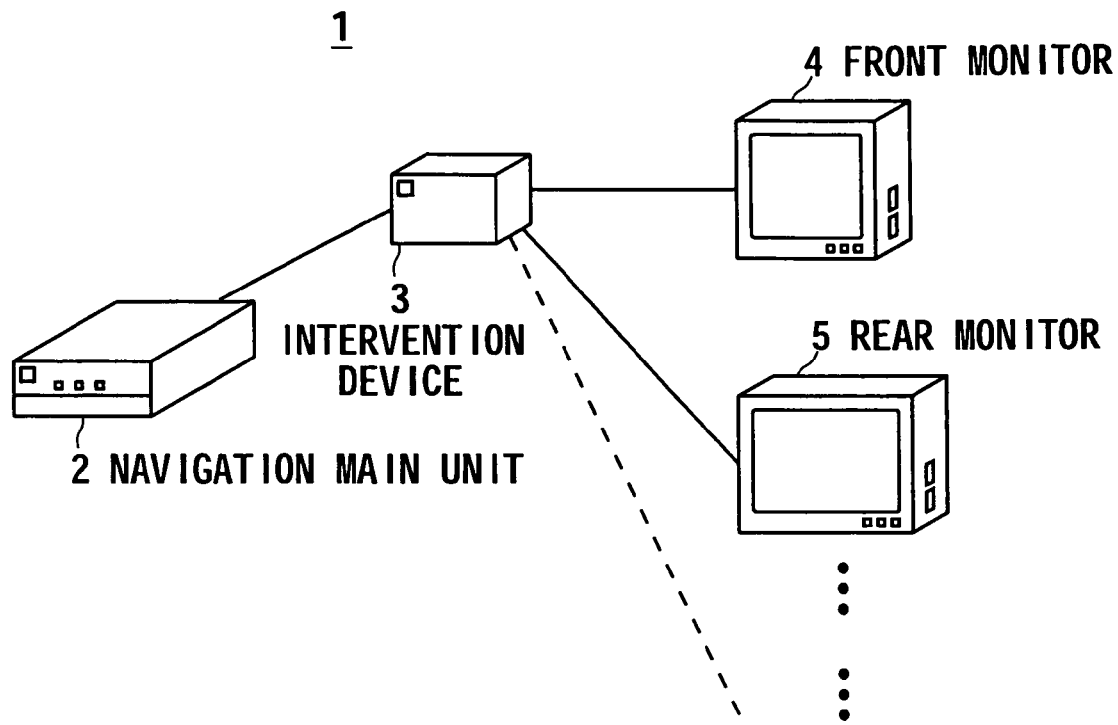
FIG. 1 is a schematic diagram showing the overall configuration of a vehicle navigation system according to an embodiment of the present invention.

With reference to FIG. 1, the reference numeral 1 denotes an in-car navigation system according to an embodiment of the present invention as a whole. In the vehicle navigation system 1, an intervention device 3 is provided between a navigation main unit 2 and a front monitor 4. An additionally connected rear monitor 5 is connected to the intervention device 3. The vehicle navigation system 1 is also connected to third and subsequent monitors (not shown) via the intervention device 3 as well as the front monitor 4 and the rear monitor 5.

(1-1) Role of Intervention Device

Figure 2:
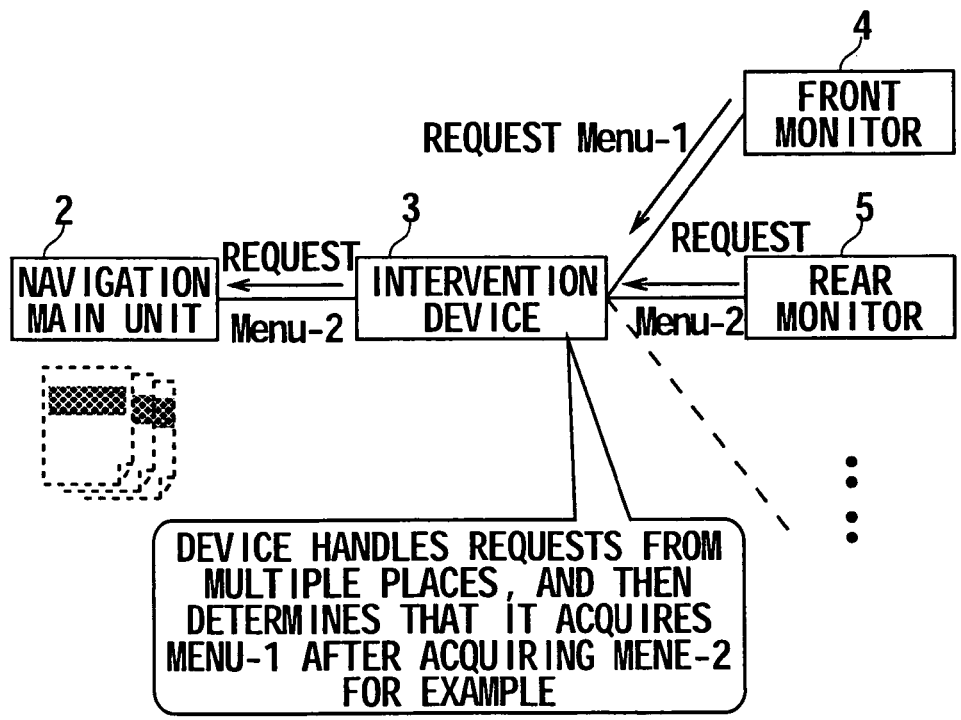
FIG. 2 is a schematic diagram for illustrating the role of an intervention device.

As shown in FIG. 2, the navigation main unit 2 is essentially set to single-sequence to perform processes in response to a request from the front monitor 4. However, in this case, the intervention device 3 receives requests from both the front monitor 4 and the rear monitor 5, and determines the most efficient request order based on contents of the requests received from the front monitor 4 and the rear monitor 5. The intervention device 3 then follows the request order to send the menu acquisition requests to the navigation main unit 2 as if only the front monitor 4 sends them to the navigation main unit 2. This allows the navigation main unit 2 to be virtually multi-sequentialized.

The intervention device 3 is capable of mediating or adjusting data between the navigation main unit 2 and the front monitor 4, and the navigation main unit 2 and the rear monitor 5. The intervention device 3 is also capable of emulating the navigation main unit 2. Therefore, from the point of view of the front monitor 4, the navigation main unit 2 seems to be provided exclusively for the front monitor 4. By contrast, from the point of view of monitor 5, the navigation main unit 2 seems to be provided exclusively for the rear monitor 5.

That is to say, in the vehicle navigation system 1, the intervention device 3 mediates or adjusts between the navigation main unit 2 and the front monitor 4, and the navigation main unit 2 and the rear monitor 5. Accordingly, from the point of view of the navigation main unit 2, the menu acquisition requests seem to be transmitted from only the front monitor 4 or the rear monitor 5. Therefore, the navigation main unit 2 can perform processes in single-sequence as it used to do.

For example, when the front monitor 4 sends an acquisition request requesting a menu-1 screen and the rear monitor 5 sends an acquisition request requesting a menu-2 screen, the intervention device 3 recognizes the contents of the requests received from the front monitor 4 and the rear monitor 5, and determines the most efficient menu screen acquisition order using a menu tree structure (hierarchical structure) described below. Then, the intervention device 3 follows the menu screen acquisition order to send the menu acquisition requests to the navigation main unit 2. In this case, the intervention device 3 for example requests the menu-2 screen and the menu-1 screen in that order.

The navigation main unit 2 follows the order of the requests received from the intervention device 3 to supply to the intervention device 3 the menu-2 screen and the menu-1 screen in that order. The intervention device 3 outputs the menu-2 screen to the rear monitor 5, and then outputs the menue-1 screen to the front monitor 4.

The circuit configuration of the navigation main unit 2, intervention device 3, front monitor 4 and rear monitor 5 of the vehicle navigation system 1 will be described hereinafter.

(1-2) Circuit Configuration of Navigation Main Unit

Figure 3:
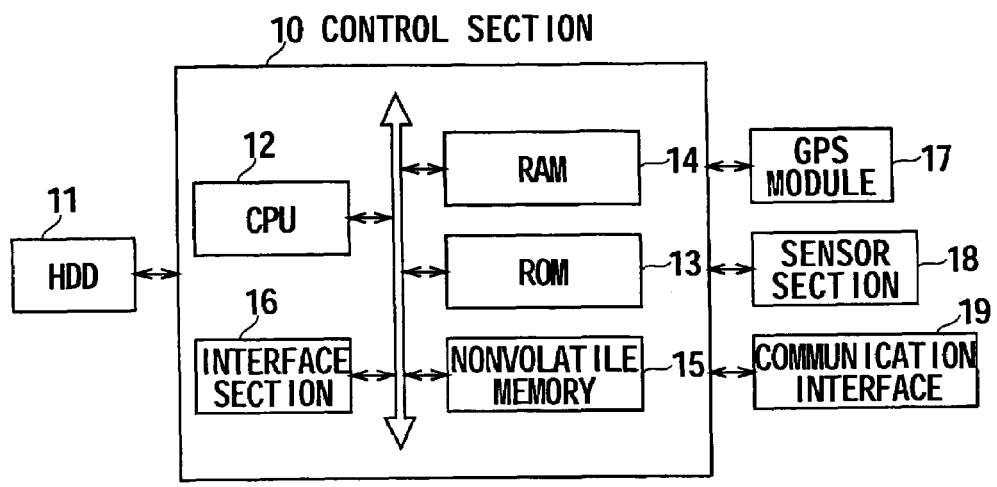
FIG. 3 is a schematic block diagram showing the circuit configuration of a navigation main unit.

As shown in FIG. 3, in the navigation main unit 2, a CPU 12 of a control section 10 runs the basic program and application programs stored in a Read Only Memory (ROM) 13 on a Random Access Memory (RAM) 14 to perform typical navigation processes and to take overall control of the unit 2.

The control section 10 includes a nonvolatile memory 15. The nonvolatile memory 15 saves data used in the RAM 14 when electric power is cut off. The control section 10 also includes an interface section 16. The interface section 16 is utilized for peripheral devices (not shown) which connect to the navigation main unit 2. By the way, a battery-powered backup Static Random Access Memory (SRAM), a flash memory, and the like are used as the nonvolatile memory 15.

The control section 10 of the navigation main unit 2 is connected to a hard disk drive 11. In addition, the control section 10 is connected to a Global Positioning System (GPS) module 17, a sensor section 18, and a communication section 19. The GPS module 17 is used for determining one's present position. The sensor section 18 includes a vibrating structure gyroscope and acceleration sensor used for detecting the driving condition and behavior of car, the mounting condition of front monitor 4 and rear monitor 5, the rate of rotation of wheels, the turning angle velocity of car body. The communication interface 19 is used for connecting to other electric devices and a network such as a Local Area Network (LAN) and a Wide Area Network (WAN).

Other than the above-noted sensors, any of the following can be applied to the sensor section 18: a parking brake switch for detecting conditions of vehicle driving operation devices; a brake lamp switch; a steering rudder angle sensor; and a throttle open angle sensor. For example, any of the following can be applied to the communication interface 19: a wired communication means such as Universal Serial Bus (USB); a wireless communication means such as Bluetooth (Registered Trademark); and an off-line communication means using removable media such as MEMORY STICK (Registered Trademark of Sony Corporation).

The control section 10 reads various kinds of menu screens, map data, content data such as music and movies, route search information and the like from the hard disk drive 11, and supplies them via the communication interface 19 to the front monitor 4 and the rear monitor 5.

(1-3) Circuit Configuration of Front Monitor and Rear Monitor

The circuit configuration of the front monitor 4 and rear monitor 5 will be described. However, in this case, the configuration of the front monitor 4 is the same as that of the rear monitor 5. Accordingly, as a matter of convenience of description, the description about the rear monitor 5 will be omitted, and the configuration of the front monitor 4 will be described below.

Figure 4:
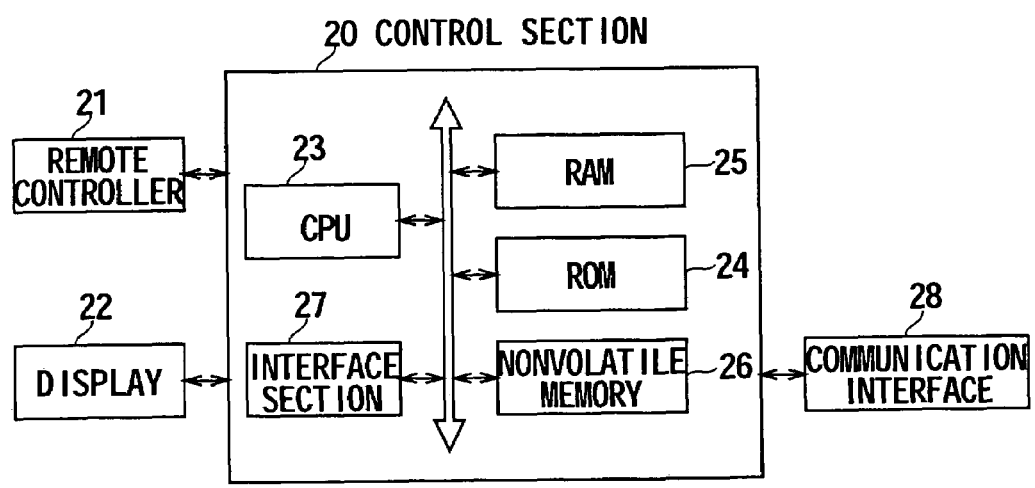
FIG. 4 is a schematic block diagram showing the circuit configuration of a front monitor and a rear monitor.

As shown in FIG. 4, in the front monitor 4, a CPU 23 of a control section 20 runs the basic program and application programs stored in a ROM 24 on a RAM 25 to take overall control of the monitor 4. The CPU 23 controls a communication interface 28 to receive the various kinds of menu screen, map data, content data such as music and movies, search information and the like transmitted from the navigation main unit 2 through the intervention device 3. The CPU 23 then displays them on a display 22.

When the data which is desirable to be saved even after electric power is cut off is specified by a remote controller 21, the front monitor 4 stores it in a nonvolatile memory 26. The front monitor 4 can read it from the nonvolatile memory 26 to display it on the display 22, when the need arises. The front monitor 4 also includes an interface section 27. The interface section 27 is utilized for peripheral devices (not shown) which connect to the front monitor 4.

(1-4) Circuit Configuration of Intervention Device

Figure 5:
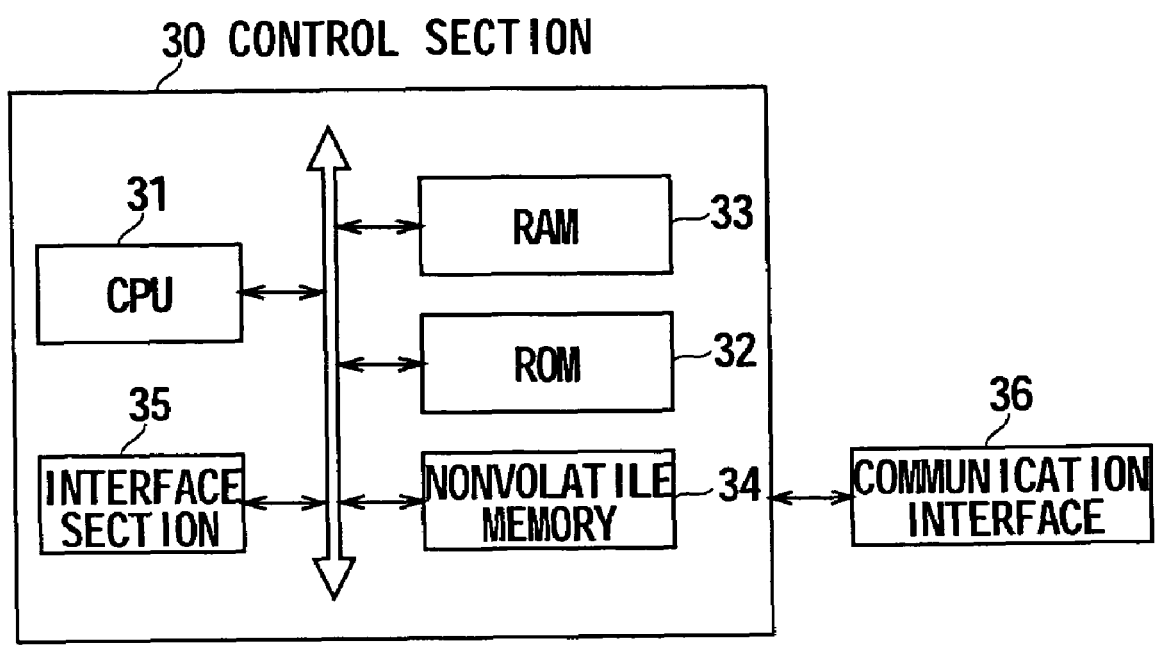
FIG. 5 is a schematic block diagram showing the circuit configuration of the intervention device.

With reference to FIG. 5, the circuit configuration of the intervention device 3 will be described. In the intervention device 3, a CPU 31 of a control section 30 runs the basic program and application programs stored in a ROM 32 on a RAM 33 to take overall control of the device 3. The CPU 31 follows an intervention process program (one of the application programs) to perform mediation processes and adjustment processes between the navigation main unit 2 and the front monitor 4, and the navigation main unit 2 and the rear monitor 5.

The intervention device 3 is connected via an interface section 35 to the navigation main unit 2 using wired connection. The intervention device 3 is connected via a communication interface 36 to the front monitor 4 and the rear monitor 5 using wireless connection. The communication interface 36 is also utilized for the additional connection of monitors other than the rear monitor 5.

(1-5) Menu Tree Structure

When receiving the menu acquisition request from the front monitor 4 or the rear monitor 5 via the intervention device 3, the navigation main unit 2 sends various kinds of menu screens. The menu screens have made up the hierarchical menu tree structure. The menu tree structure will be described in detail hereinafter.

Figure 6:
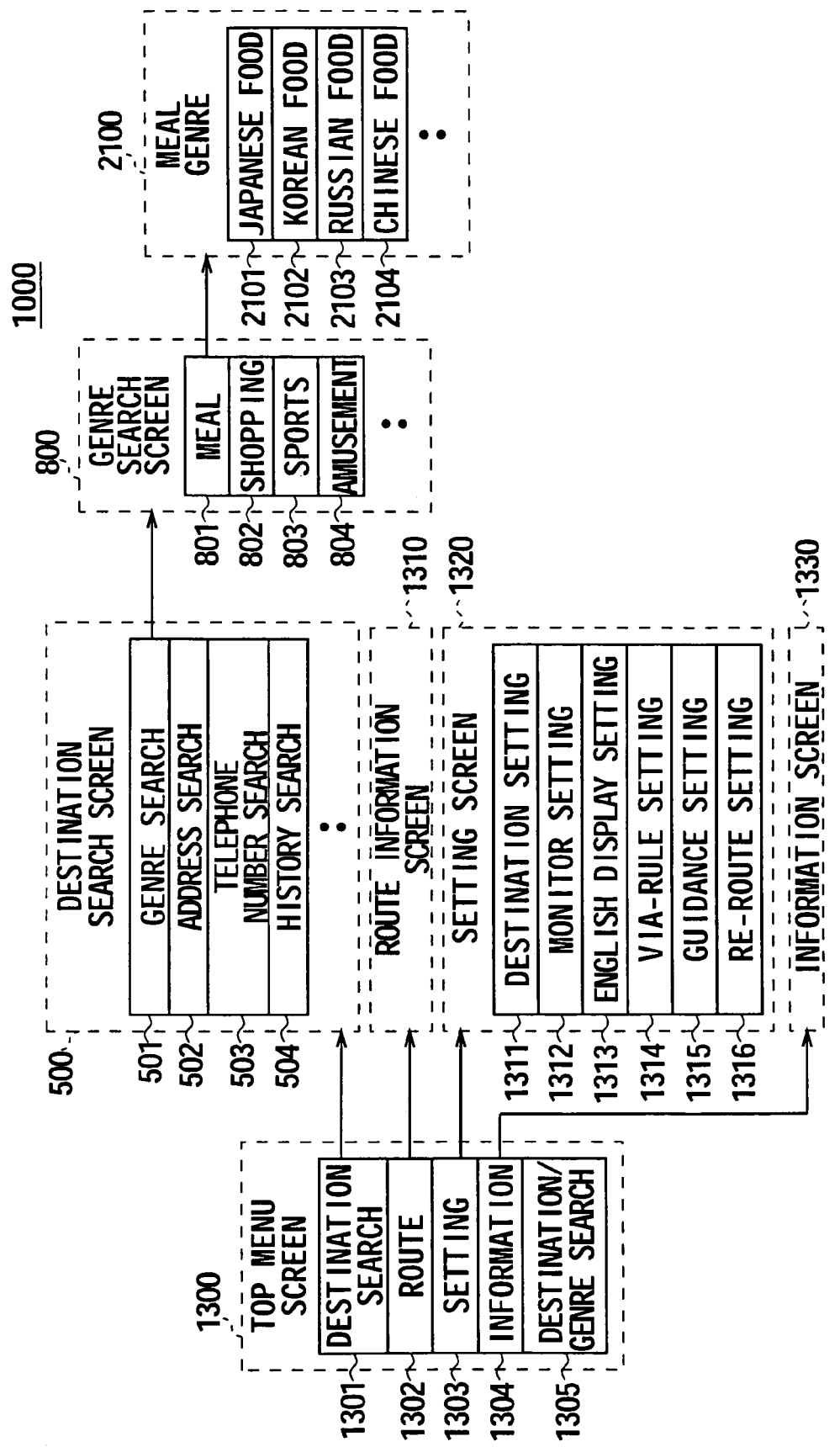
FIG. 6 is a schematic diagram showing a menu tree structure.
Figure 7:
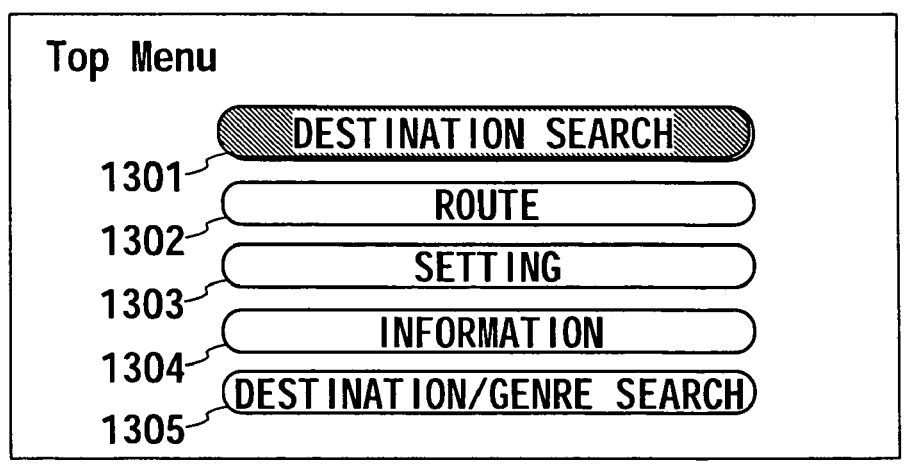
FIG. 7 is a schematic diagram showing a top menu screen.

As shown in FIG. 6, the navigation main unit 2 typically shows a top menu screen 1300 (FIG. 7) first as a top layer screen based on a menu tree structure 1000. The top menu screen 1300 includes a "Destination search" item 1301, a "Route" item 1302, a "Setting" item 1303, an "Information" item 1304, and a "Destination/Genre search" item 1305.

Figure 8:
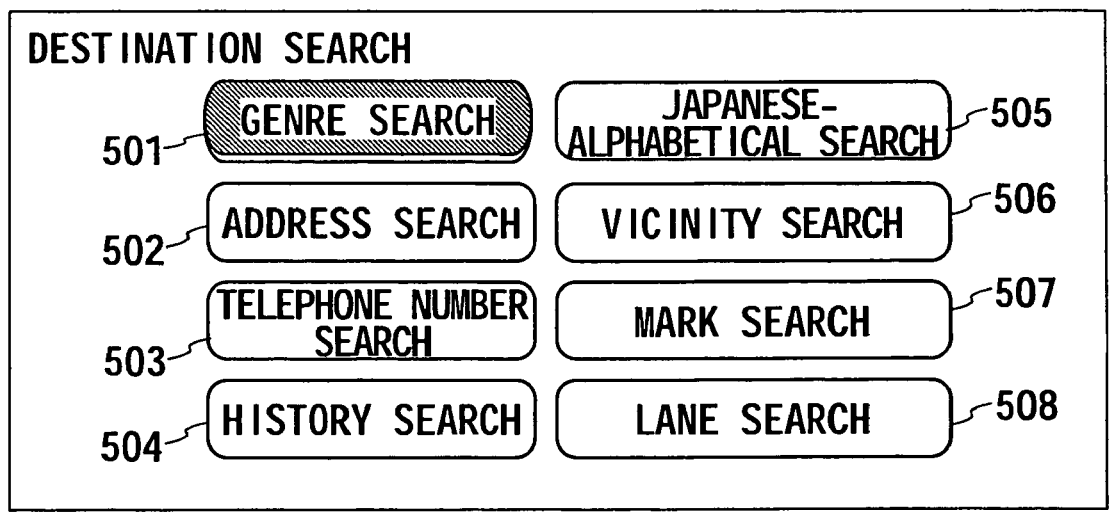
FIG. 8 is a schematic diagram showing a destination search screen.

A destination search screen 500 shown in FIG. 8 for example belongs to the "destination search" item 1301 of the top menu screen 1300 as a lower layer screen. The destination search screen 500 includes a "Genre search" item 501, an "Address search" item 502, a "Telephone number search" item 503, a "History search" item 504, a "Japanese-alphabetical search" item 505, a "Vicinity search" item 506, a "Mark search" item 507, and a "Lane search" item 508.

A route information screen 1310 for example belongs to the "Route" item 1302 of the top menu screen 1300 (FIG. 6) as a lower layer screen. A setting screen 1320 for example belongs to the "setting" item 1303 of the top menu screen 1300 as a lower layer screen. An information screen 1330 for example belongs to the "Information" item 1304 of the top menu screen 1300 as a lower layer screen. A destination/genre search screen for example belongs to the "Destination/genre search" item 1305 as a lower layer screen. The destination/genre search screen will be described below.

Figure 9:
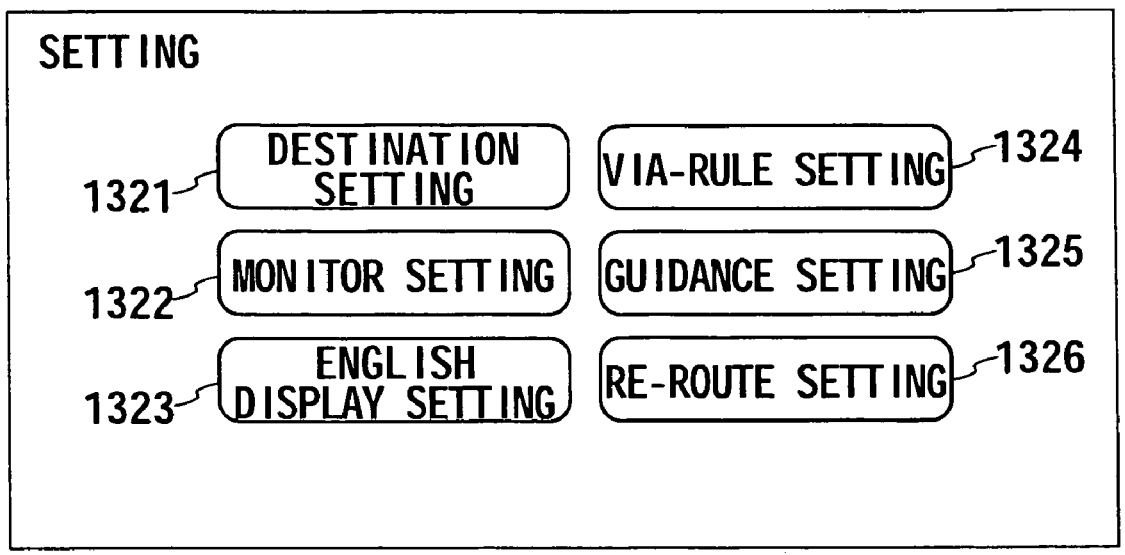
FIG. 9 is a schematic diagram showing a setting screen.

For example, as shown in FIG. 9, the setting screen 1320 includes a "Destination setting" item 1321, a "Monitor setting" item 1322, an "English display setting" item 1323, a "Via-rule setting" item 1324, a "Guidance setting" item 1325, and a "Re-route setting" item 1326.

By the way, the route information screen 1310 and the information-screen 1330 are provided. Lower layer screens of the route information screen 1310 and information screen 1330 are also provided. However, as a matter of convenience, description about them will be omitted.

Figure 10:
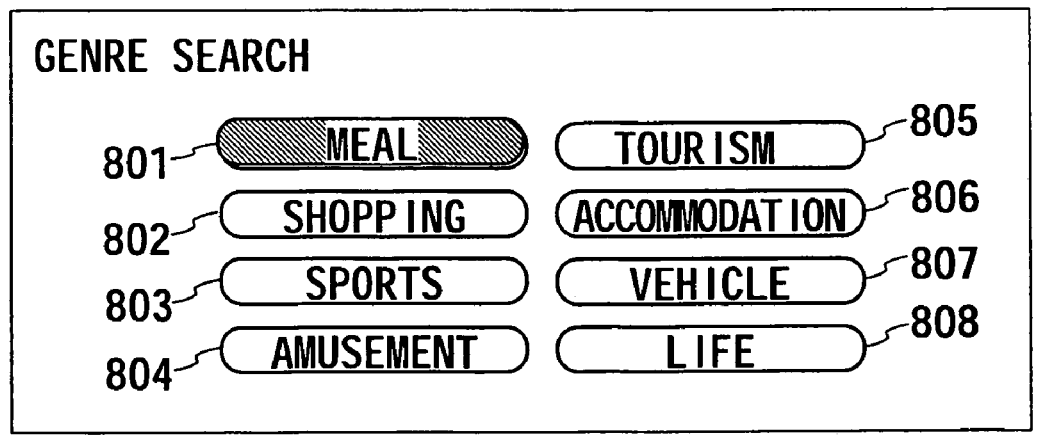
FIG. 10 is a schematic diagram showing a genre search screen.

A genre search screen 800 shown in FIG. 10 for example belongs to the "genre search" item 501 of the destination search screen 500 as a lower layer screen. The genre search screen 800 includes a "Meal" item 801, a "Shopping" item 802, a "Sports" item 803, an "Amusement" item 804, a "Tourism" item 805, an "Accommodation" item 806, a "Vehicle" item 807, and a "Life" item 808.

Figure 11:
FIG. 11 is a schematic diagram showing a meal genre screen.

A meal genre screen 2100 shown in FIG. 11 for example belongs to the "Meal" item 801 of the genre search screen 800 as a lower layer screen. The meal genre screen 2100 includes a "Japanese food" item 2101, a "Korean food" item 2102, a "Russian food" item 2103, a "Chinese food" item 2104, a "Western food" item 2105, and a "Vietnamese food" item 2106.

Accordingly, if the navigation main unit 2 receives the acquisition requests for menu screens from the front monitor 4 or the rear monitor 5 via the intervention device 3, the navigation main unit 2 moves to lower or upper layer step by step based on the menu tree structure 1000, and reads the menu screens corresponding to the acquisition requests from the hard disk drive 11 to supply them.

The database of the menu tree structure 1000 is also constructed in the nonvolatile memory 34 of the intervention device 3. Before transmitting to the navigation main unit 2 the acquisition requests received from both the front monitor 4 and rear monitor 5, the intervention device 3 determines the most efficient acquisition request order based on the menu tree structure 1000.

(2) Mediating/Adjusting Process

The mediating and adjusting process will be described in detail hereinafter. The intervention device 3 performs the mediating and adjusting process between the navigation main unit 2 and the front monitor 4, and the navigation main unit 2 and the rear monitor 5.

(2-1) Menu Screen Mediating Process in Dependence Upon Hierarchical Structures

Figure 12:
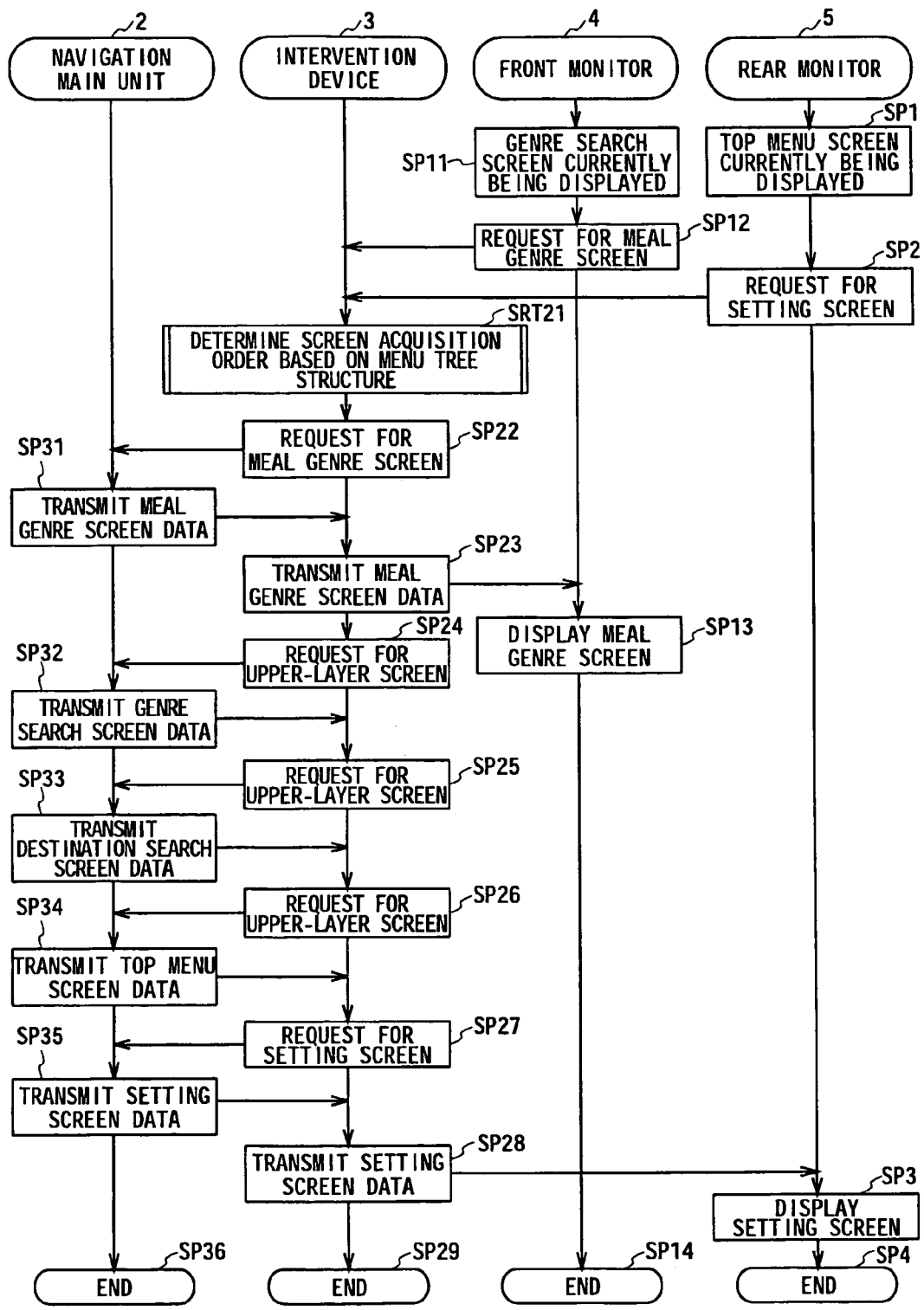
FIG. 12 is a sequence chart showing a menu screen mediating process in dependence upon a hierarchical structure.

Referring to a sequence chart shown in FIG. 12, the "menu screen mediating process in dependence upon hierarchical structures" will be described hereinafter. The intervention device 3 performs this process between the navigation main unit 2 and the front monitor 4, and the navigation main unit 2 and the rear monitor 5.

At step SP1, the rear monitor 5, during displaying the top menu screen 1300 (FIG. 7) on the display 22, proceeds to step SP2, for example. The rear monitor 5 then sends to the intervention device 3 an acquisition request which requests the setting screen 1320 (FIG. 9) corresponding to the "Setting" item 1303, and proceeds to next step SP3.

In the meantime, the front monitor 4, during displaying for example the genre search screen 800 (FIG. 9) at step SP11, proceeds to step SP12. The front monitor 4 then sends to the intervention device 3 an acquisition request which requests the meal genre screen 2100 (FIG. 10) corresponding to the "Meal" item 801 of the genre search screen 800, and proceeds to next step SP13.

When receiving the acquisition requests from the front monitor 4 and the rear monitor 5, the intervention device 3 at subroutine SRT21 respects the above-noted menu tree structure 1000 to decide the most efficient screen acquisition order. To decide the most efficient screen acquisition order, the intervention device 3 determines which acquisition request should be sent first based on the acquisition request for setting screen 1320 received from the rear monitor 5 and the acquisition request for meal genre screen 2100 received from the front monitor 4. The intervention device 3 subsequently proceeds to next step SP22.

Figure 13:
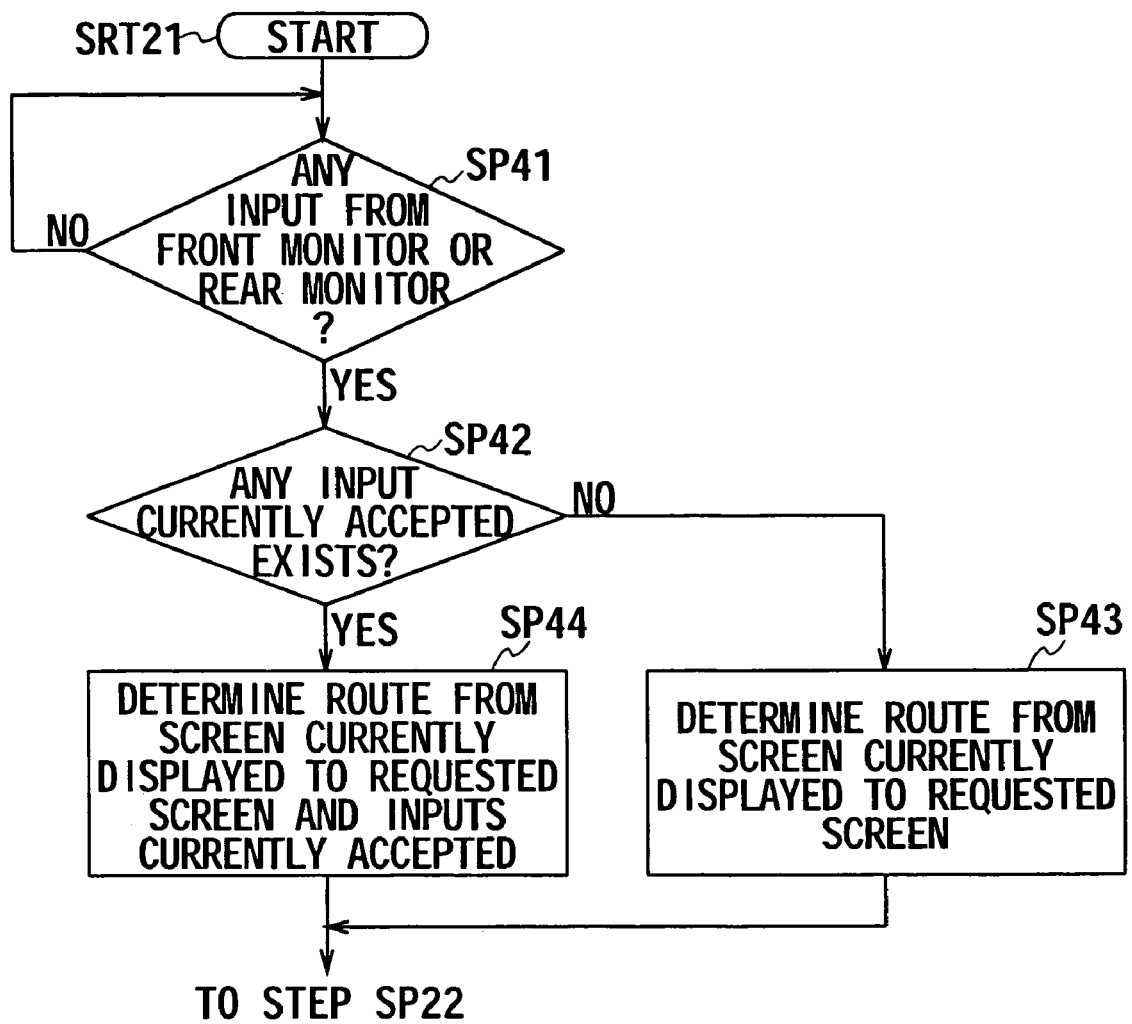
FIG. 13 is a flowchart showing a screen acquisition order determination process.

Specifically, as shown in FIG. 13, the intervention device 3 starts the subroutine SRT21 from step SP41. At step SP41, the intervention device 3 checks whether or not it has received any acquisition requests for menu screens from the front monitor 4 or the rear monitor 5 via the communication interface 36.

Negative result at step SP41 means that the intervention device 3 has not receive any acquisition requests for menu screens from the front monitor 4 or the rear monitor 5. In this case, the intervention device 3 waits here until acquisition requests are input.

Affirmative result at step SP41 means that the intervention device 3 has received an acquisition request for menu screens from the front monitor 4 or the rear monitor 5. In this case, the intervention device 3 proceeds to next step SP42.

At step SP42, the intervention device 3 checks whether or not it has already accepted any acquisition requests from the front monitor 4 or the rear monitor 5. Negative result at step SP42 means that the acquisition request was done at step SP41 and that any acquisition requests have not been accepted yet at step SP42, i.e., the intervention device 3 has received an acquisition request only from either the front monitor 4 or the rear monitor 5. In this case, the intervention device 3 proceeds to next step SP43.

At step SP43, the intervention device 3 recognizes that it does not have to perform the mediating process of acquisition requests between the front monitor 4 and the rear monitor 5, since it has received the acquisition request only from either the front monitor 4 or the rear monitor 5. Then, if the intervention device 3 has received the acquisition request from the front monitor 4 (or the rear monitor 5), the intervention device 3 determines a route on the menu tree structure 1000 from the genre search screen 800 currently displayed on the front monitor 4 (or the top menu screen 1300 currently displayed on the rear monitor 5) to the requested layer's screen to decide a screen acquisition order. The intervention device 3 subsequently proceeds to next step SP22.

By contrast, affirmative result at step SP42 means that the acquisition request was done at step SP41 and that the intervention device 3 at step SP42 currently has an acquisition request accepted, i.e., the intervention device 3 has to perform the meditating process since it has received acquisition requests from both the front monitor 4 and the rear monitor 5. In this case, the intervention device 3 proceeds to next step SP44.

At step SP44, the intervention device 3 determines the most efficient acquisition route on the menu tree structure 1000 from the genre search screen 800 currently displayed on the front monitor 4 and the top menu screen 1300 currently displayed on the rear monitor 1300 to the requested layer's screens to decide a screen acquisition order. The intervention device 3 then proceeds to next step SP22.

At step SP22, the intervention device 3 follows the screen acquisition order determined at the subroutine SRT21 to send the acquisition requests. In this case, the intervention device 3 sends the acquisition request for meal genre screen 2100 received from the front monitor 4 prior to the one received from the rear monitor 5 to request the meal genre screen 2100 from the navigation main unit 2. The intervention device 3 then proceeds to next step SP23.

At this time, the navigation main unit 2 at step SP31 reads the meal genre screen data from the hard disk drive 11 in response to the acquisition request for meal genre screen 2100 received from the intervention device 3. The navigation main unit 2 subsequently transmits the meal genre screen data to the intervention device 3, and then proceeds to next step SP32.

The intervention device 3 at step SP23 transmits to the front monitor 4 the meal genre screen data received from the navigation main unit 2, and then proceeds to next step SP24.

The front monitor 4 at step SP13 displays the meal genre screen 2100 on the display 22 based on the meal genre screen data received from the intervention device 3, and then proceeds to next step SP14 to end the process.

The intervention device 3 at step SP24 starts processes to cope with the acquisition request for setting screen 1310 received from the rear monitor 5, since the intervention device 3 has finished transmitting the meal genre screen data to the front monitor 4. That is to say, the intervention device 3 sends to the navigation main unit 2 an acquisition request for the screen upper than the meal genre screen 2100 which was transmitted to the front monitor 4 earlier. The intervention device 3 then proceeds to next step SP25.

At step SP32, in response to the acquisition request for upper-layer screen received from the intervention device 3, the navigation main unit 2 reads from the hard disk drive 11 a genre search screen data which is in a layer immediate above the meal genre screen 2100, and transmits it to the intervention device 3. The navigation main unit 2 then proceeds to next step SP33.

At step SP25, when receiving the genre search screen data, the intervention device 3 sends to the navigation main unit 2 an acquisition request for the screen upper than the genre-search screen, and then proceeds to step SP26.

At step SP33, in response to the acquisition request for upper-layer screen received from the intervention device 3, the navigation main unit 2 reads from the hard disk drive 11 a destination search screen data of the destination search screen 500 which is in a layer immediate above the genre search screen 800, and transmits it to the intervention device 3. The navigation main unit 2 then proceeds to next step SP34.

At step SP26, when receiving the destination search screen data, the intervention device 3 sends to the navigation main unit 2 an acquisition request for the screen upper than the destination search screen, and then proceeds to next step SP27.

At step SP34, in response to the acquisition request for upper-layer screen received from the intervention device 3, the navigation main unit 2 reads from the hard disk drive 11 a top menu screen data of the top menu screen 1300 which is in a layer immediate above the destination search screen 500, and transmits it to the intervention device 3. The navigation main unit 2 then proceeds to next step SP35.

At step SP27, when receiving the top menu screen data, the intervention device 3 sends to the navigation main unit 2 an acquisition request for the setting screen 1320 which is in a layer immediate below the top menu screen, and then proceeds to next step SP28.

The navigation main unit 2 at step SP35 reads a setting screen data from the hard disk drive 11 in response to the acquisition request for setting screen 1320 received from the intervention device 3, and transmits it to the intervention device 3. The navigation main unit 2 then proceeds to next step SP36 to end the process.

At step SP28, when receiving the setting screen data from the navigation main unit 2, the intervention device 3 transmits the setting screen data to the rear monitor 5. The intervention device 3 then proceeds to next step SP29 to end the process.

The rear monitor 5 at step SP3 displays the setting screen 1320 on the display 22 based on the setting screen data received from the intervention device 3, and then proceeds to next step SP4 to end the process.

As described above, when receiving the acquisition requests for meal genre screen 2100 and setting screen 1320 from the front monitor 4 and the rear monitor 5 respectively, the intervention device 3 determines the most efficient screen acquisition order. The intervention device 3 then follows the screen acquisition order to send the acquisition requests to the navigation main unit 2. This allows the navigation main unit 2 to perform processes in single-sequence, and causes the same effect as if the navigation main unit 2 is performing in multi-sequence.

Figure 14:
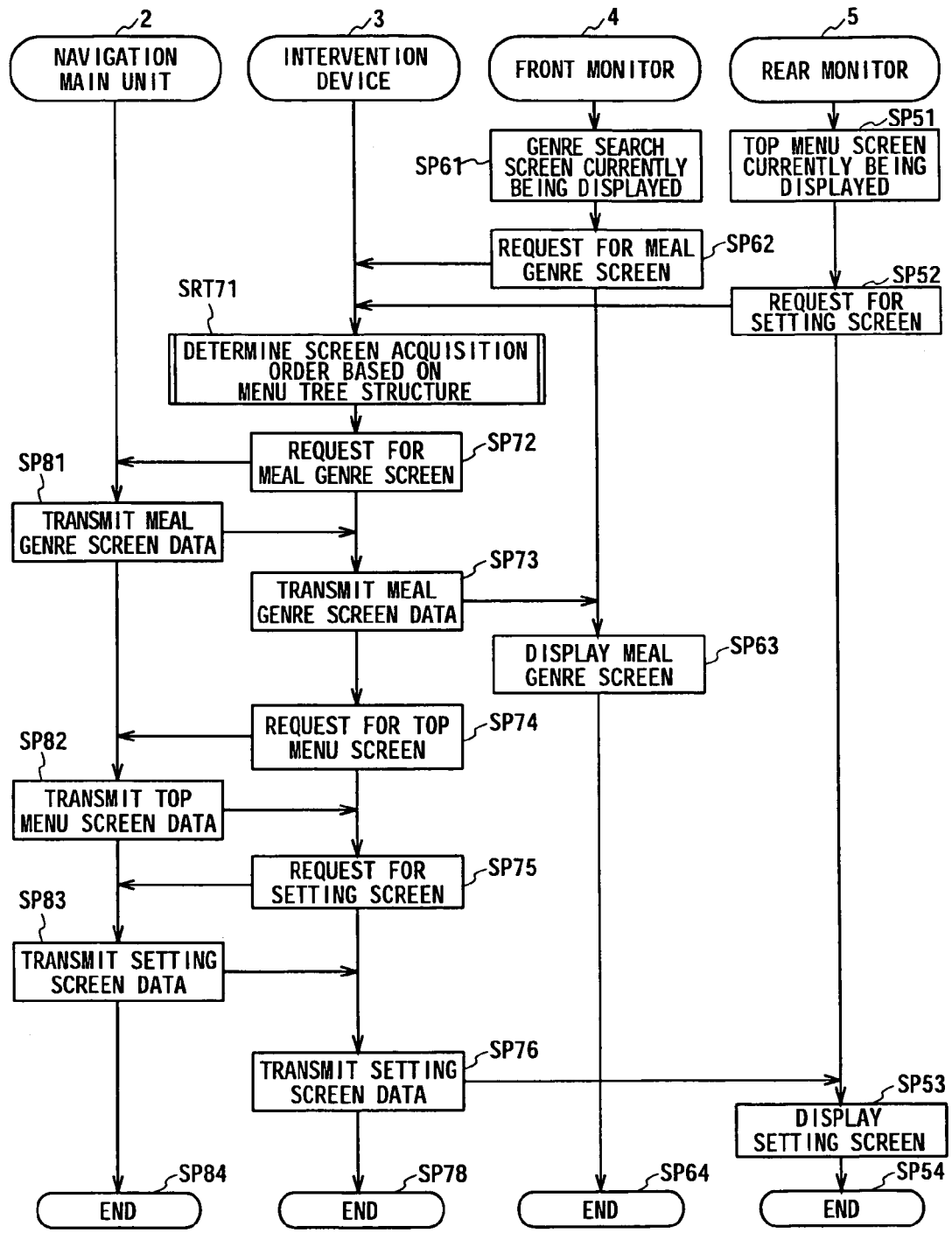
FIG. 14 is a sequence chart showing a first menu screen mediating process not restricted by a hierarchical structure.

(2-2) First Menu Screen Mediating Process not Restricted by Hierarchical Structures Referring to a sequence chart shown in FIG. 14, the "first menu screen mediating process not restricted by hierarchical structures" will be described hereinafter. The intervention device 3 performs this process between the navigation main unit 2 and the front monitor 4, and the navigation main unit 2 and the rear monitor 5.

At step SP51, the rear monitor 5, during displaying the top menu screen 1300 (FIG. 7) on the display 22, proceeds to step SP52, for example. The rear monitor 5 then sends to the intervention device 3 an acquisition request which requests the setting screen 1320 (FIG. 9) corresponding to the "Setting" item 1303, and proceeds to next step SP53.

In the meantime, the front monitor 4, during displaying for example the genre search screen 800 (FIG. 9) at step SP61, proceeds to step SP62. The front monitor 4 then sends to the intervention device 3 an acquisition request which requests the meal genre screen 2100 (FIG. 10) corresponding to the "Meal" item 801 of the genre search screen 800, and proceeds to next step SP63.

When receiving the acquisition requests from the front monitor 4 and the rear monitor 5, the intervention device 3 at subroutine SRT71 respects the above-noted menu tree structure 1000 to decide the most efficient screen acquisition order. To decide the most efficient screen acquisition order, the intervention device 3 determines which acquisition request should be sent first based on the acquisition request for setting screen 1320 received from the rear monitor 5 and the acquisition request for meal genre screen 2100 received from the front monitor 4. The intervention device 3 subsequently proceeds to next step SP72.

In this manner, the intervention device 3 performs the screen acquisition order determination process in the subroutine SRT71, which is the same as the screen acquisition order determination process (FIG. 13) in the above-noted subroutine SRT21. Therefore, description about it will be omitted.

At step SP72, the intervention device 3 follows the screen acquisition order determined at the subroutine SRT71 to send the acquisition requests. In this case, the intervention device 3 sends the acquisition request for meal genre screen 2100 received from the front monitor 4 prior to the one received from the rear monitor 5 to request the meal genre screen 2100 from the navigation main unit 2. The intervention device 3 then proceeds to next step SP73.

At this time, the navigation main unit 2 at step SP81 reads the meal genre screen data from the hard disk drive 11 in response to the acquisition request for meal genre screen 2100 received from the intervention device 3. The navigation main unit 2 subsequently transmits the meal genre screen data to the intervention device 3, and then proceeds to next step SP82.

The intervention device 3 at step SP73 transmits to the front monitor 4 the meal genre screen data received from the navigation main unit 2, and then proceeds to next step SP74.

The front monitor 4 at step SP63 displays the meal genre screen 2100 on the display 22 based on the meal genre screen data received from the intervention device 3, and then proceeds to next step SP64 to end the process.

By the way, after transmitting the meal genre screen data to the front monitor 4, the intervention device 3 was supposed to request upper-layer screens step by step, i.e., the genre search screen 800, the destination search screen 500, and the top menu screen 1300 in that order. However, in this case, the intervention device 3 at step SP74 directly requests the top-layer top menu screen 1300 from the navigation main unit 2, and then proceeds to next step SP75.

The navigation main unit 2 at step SP82 reads the top menu screen data from the hard disk drive 11 in response to the acquisition request for top menu screen 1300 received from the intervention device 3, and then transmits it to the intervention device 3. The navigation main unit 2 subsequently proceeds to next step SP83.

At step SP75, when receiving the top menu screen data from the navigation main unit 2, the intervention device 3 sends to the navigation main unit 2 an acquisition request for the setting screen 1320 which is in a layer immediate below the top menu screen, and then proceeds to step SP76.

The navigation main unit 2 at step SP83 reads a setting screen data from the hard disk drive 11 in response to the acquisition request for setting screen 1320 received from the intervention device 3, and transmits it to the intervention device 3. The navigation main unit 2 then proceeds to next step SP84 to end the process.

At step SP76, when receiving the setting screen data from the navigation main unit 2, the intervention device 3 transmits the setting screen data to the rear monitor 5. The intervention device 3 then proceeds to next step SP78 to end the process.

The rear monitor 5 at step SP53 displays the setting screen 1320 on the display 22 based on the setting screen data received from the intervention device 3, and then proceeds to next step SP54 to end the process.

As described above, when receiving the acquisition requests for meal genre screen 2100 and setting screen 1320 from the front monitor 4 and the rear monitor 5 respectively, the intervention device 3 determines the most efficient screen acquisition order. According to the screen acquisition order, the intervention device 3 first acquires the meal genre screen 2100 which is in a layer immediate below the genre search screen 800 being displayed on the front monitor 4, then directly moves to the top-layer top menu screen 1300 from the bottom-layer meal genre screen 2100, and then acquires the setting screen 1320 which is in a layer immediate below the top menu screen 1300. In this manner, the intervention device 3 follows the screen acquisition order to send the acquisition requests to the navigation main unit 2. This allows the navigation main unit 2 to perform processes in single-sequence, and causes the same effect as if the navigation main unit 2 is performing in multi-sequence.

Figure 15:
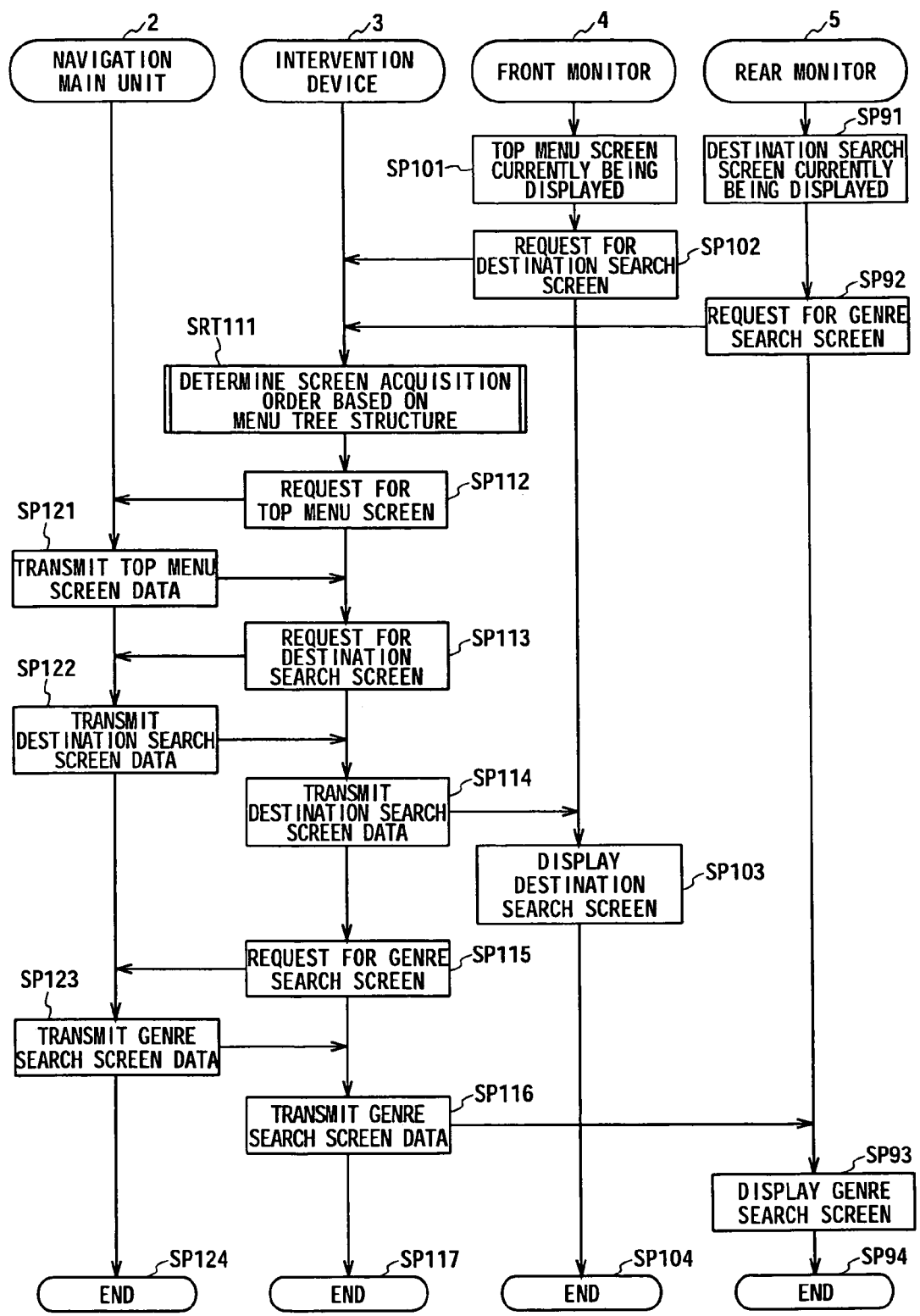
FIG. 15 is a sequence chart showing a second menu screen mediating process not restricted by a hierarchical structure.

(2-3) Second Menu Screen Mediating Process not Restricted by Hierarchical Structures Referring to a sequence chart shown in FIG. 15, the "second menu screen mediating process not restricted by hierarchical structures" will be described hereinafter. The intervention device 3 performs this process between the navigation main unit 2 and the front monitor 4, and the navigation main unit 2 and the rear monitor 5.

At step SP91, the rear monitor 5, during displaying the destination search screen 500 (FIG. 8) on the display 22, proceeds to step SP92, for example. The rear monitor 5 then sends to the intervention device 3 an acquisition request which requests the genre search screen 800 (FIG. 10) corresponding to the "Genre search" item 501, and proceeds to next step SP93.

In the meantime, the front monitor 4, during displaying for example the top menu screen 1300 (FIG. 7) at step SP101, proceeds to step SP102. The front monitor 4 then sends to the intervention device 3 an acquisition request which requests the destination search screen 500 (FIG. 8) corresponding to the "Destination search" item 1301 of the top menu screen 1300, and proceeds to next step SP103.

When receiving the acquisition requests from the front monitor 4 and the rear monitor 5, the intervention device 3 at subroutine SRT111 respects the above-noted menu tree structure 1000 to decide the most efficient screen acquisition order. To decide the most efficient screen acquisition order, the intervention device 3 determines which acquisition request should be sent first based on the acquisition request for genre search screen 800 received from the rear monitor 5 and the acquisition request for destination search screen 500 received from the front monitor 4. The intervention device 3 subsequently proceeds to next step SP112.

In this manner, the intervention device 3 performs the screen acquisition order determination process in the subroutine SRT111, which is the same as the screen acquisition order determination process (FIG. 13) in the above-noted subroutine SRT21. Therefore, description about it will be omitted.

In this case, the intervention device 3 can recognize the fact that the destination search screen 500 requested by the front monitor 4 is in a layer above the genre search screen 800 requested by the rear monitor 5. Therefore, the intervention device 3 determines the most effective screen acquisition order; from the top menu screen 1300 through the destination search screen 500 to the lower-layer genre search screen 800.

In this case, the intervention device 3 sends an acquisition request for top menu screen 1300 to the navigation main unit 2 in order to request the destination search screen 500 which is in a layer immediate below the top menu screen 1300 and to request the genre search screen 800 which is in a layer immediate below the destination search screen 500. Therefore, the acquisition request for top menu screen 1300 is a kind of pseudo, and the top menu screen 1300 will not be displayed on the front monitor 4 and the rear monitor 5.

That is to say, instead of the front monitor 4 and the rear monitor 5, the intervention device 3 sends the pseudo-like acquisition requests to the navigation main unit 2 in the following order; the top menu screen 1300, the destination search screen 500, and the genre search screen 800. This allows the navigation main unit 2 to perform processes in single-sequence.

As mentioned above, the screen acquisition order determination process performed by the intervention device 3 in the subroutine SRT111 is the same as the screen acquisition order determination process (FIG. 13) in the above-noted subroutine SRT21. Therefore, description about it will be omitted.

At step SP112, the intervention device 3 follows the screen acquisition order determined at the subroutine SRT111 to send the acquisition requests. In this case, the intervention device 3 sends to the navigation main unit 2 the acquisition request for top menu screen 1300 first. The intervention device 3 then proceeds to next step SP113.

At this time, the navigation main unit 2 at step SP121 reads the top menu screen data from the hard disk drive 11 in response to the acquisition request for top menu screen 1300 received from the intervention device 3. The navigation main unit 2 subsequently transmits the top menu screen data to the intervention device 3, and then proceeds to next step SP122.

When receiving the top menu screen data from the navigation main unit 2 at step SP113, the intervention device 3 sends to the navigation main unit 2 an acquisition request for the destination search screen 500 which is in a layer immediate below the top menu screen, and the proceeds to next step SP114.

The navigation main unit 2 at step SP122 reads the destination search screen data from the hard disk drive 11 in response to the acquisition request for destination search screen 500 received from the intervention device 3. The navigation main unit 2 subsequently transmits the destination search screen data to the intervention device 3, and then proceeds to next step SP123.

The intervention device 3 at step SP114 transmits to the front monitor 4 the destination search screen data received from the navigation main unit 2, and proceeds to next step SP115.

The front monitor 4 at step SP103 displays the destination search screen 500 on the display 22 based on the destination search screen data received from the intervention device 3, and then proceeds to next step SP104 to end the process.

After that, the intervention device 3 at step SP115 sends an acquisition request for the genre search screen 800 to the navigation main unit 2 based on the screen acquisition order determined at the subroutine SRT111, and then proceeds to next step SP116.

The navigation main unit 2 at step SP123 reads the genre search screen data from the hard disk drive 11 in response to the acquisition request for genre search screen 800 received from the intervention device 3. The navigation main unit 2 subsequently transmits the genre search screen data to the intervention device 3, and then proceeds to next step SP124 to end the process.

The intervention device 3 at step SP116 transmits to the rear monitor 5 the genre search screen data received from the navigation main unit 2, and proceeds to next step SP117 to end the process.

The rear monitor 5 at step SP93 displays the genre search screen 800 on the display 22 based on the genre search screen data received from the intervention device 3, and then proceeds to next step SP94 to end the process.

As described above, when receiving the acquisition requests for destination search screen 500 and genre search screen 800 from the front monitor 4 and the rear monitor 5 respectively, the intervention device 3 checks the positions of the destination search screen 500 and genre search screen 800 on the menu tree structure 1000 to determine the most effective screen acquisition order. The intervention device 3 then follows the screen acquisition order to send the acquisition requests to the navigation main unit 2. This allows the navigation main unit 2 to perform processes in single-sequence, and causes the same effect as if the navigation main unit 2 is performing in multi-sequence.

(2-4) Screen-Processing Adjusting Process

Figure 16:
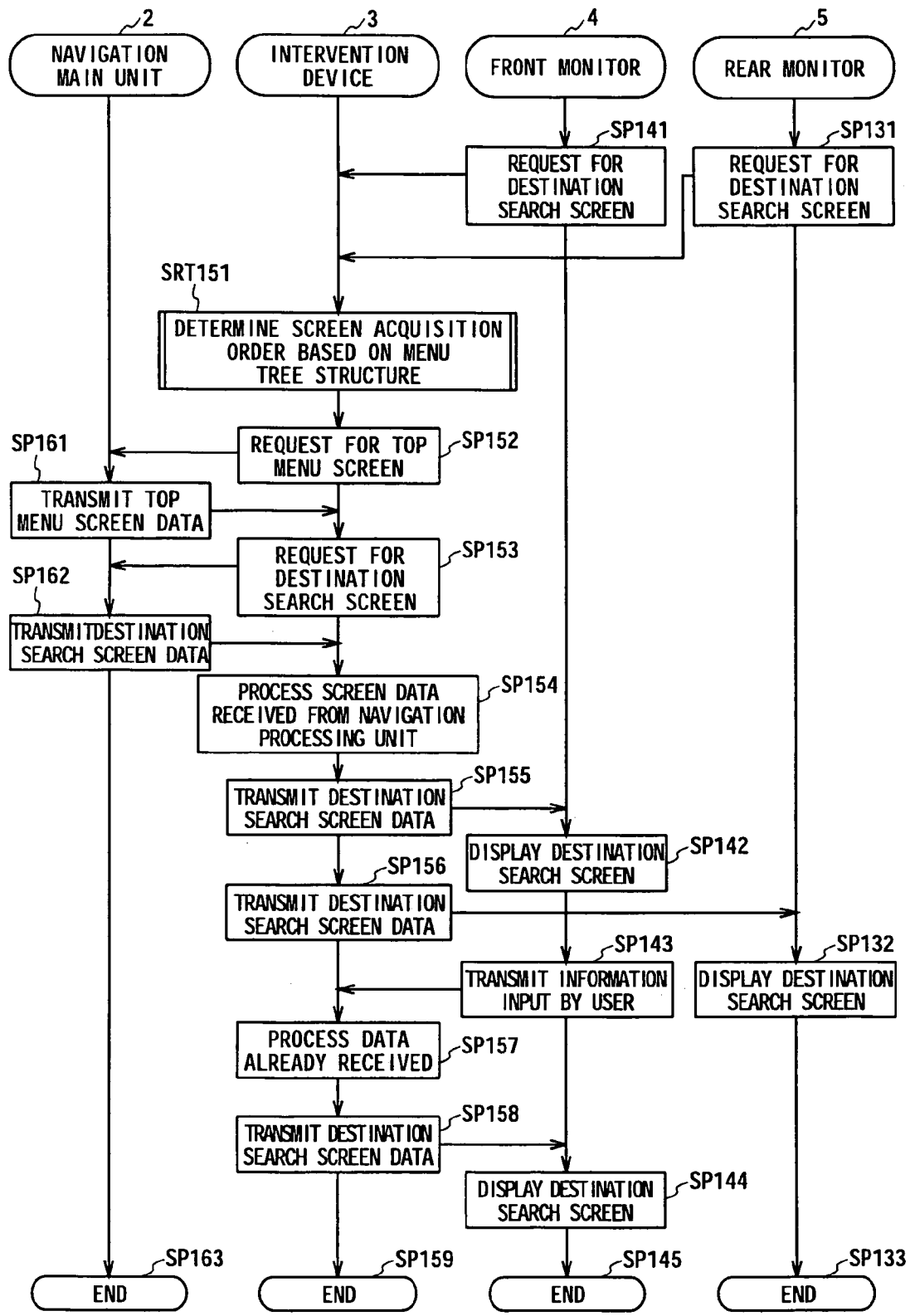
FIG. 16 is a sequence chart showing a screen-processing adjusting process.

Referring to a sequence chart shown in FIG. 16, the "screen-processing adjusting process" will be described hereinafter. The intervention device 3 performs this process between the navigation main unit 2 and the front monitor 4, and the navigation main unit 2 and the rear monitor 5.

During displaying the top menu screen 1300 (FIG. 7) at step SP131, the rear monitor 5 sends to the intervention device 3 an acquisition request for the destination search screen 500 (FIG. 8) in response to the selection of the "Destination search" item 1301 of the top menu screen 1300. The rear monitor 5 then proceeds to next step SP132.

In the meantime, the front monitor 4, during displaying the top menu screen 1300 (FIG. 7) at step SP141, sends to the intervention device 3 an acquisition request for the destination search screen 500 (FIG. 8) in response to the selection of the "Destination search" item 1301 of the top menu screen 1300. The front monitor 4 then proceeds to next step SP142.

When receiving the acquisition requests for destination search screen 500 from the front monitor 4 and the rear monitor 5, the intervention device 3 at subroutine SRT151 respects the above-noted menu tree structure 1000 to decide a screen acquisition order. The intervention device 3 subsequently proceeds to next step SP152.

In this manner, the intervention device 3 performs the screen acquisition order determination process in the subroutine SRT151, which is the same as the screen acquisition order determination process (FIG. 13) in the above-noted subroutine SRT21. Therefore, description about it will be omitted.

In this case, the intervention device 3 has received the same requests from the front monitor 4 and the rear monitor 5, i.e., the acquisition requests for destination search screen 500. Therefore, according to the screen acquisition order determined by the intervention device 3, it will first acquire the top menu screen 1300 from the navigation main unit 2, and then acquire the destination search screen 500.

At step SP152, the intervention device 3 follows the screen acquisition order determined at the subroutine SRT151 to send the acquisition requests, which is to say it first sends the acquisition request for top menu screen 1300 to the navigation main unit 2, and then proceeds to next step SP153.

At this time, the navigation main unit 2 at step SP161 reads the top menu screen data from the hard disk drive 11 in response to the acquisition request for top menu screen 1300 received from the intervention device 3. The navigation main unit 2 subsequently transmits the top menu screen data to the intervention device 3, and then proceeds to next step SP162.

At step SP153, when receiving the top menu screen data from the navigation main unit 2, the intervention device 3 sends to the navigation main unit 2 an acquisition request for the destination search screen 500 which is in a layer immediate below the top menu screen, and then proceeds to step SP154.

The navigation main unit 2 at step SP162 reads the destination search screen data from the hard disk drive 11 in response to the acquisition request for destination search screen 500 received from the intervention device 3. The navigation main unit 2 then transmits the destination search screen data to the intervention device 3, and proceeds to next step SP163 to end the process.

The intervention device 3 at step SP154 acquires from the navigation processing unit the destination search screen data in bulk. This destination search screen data will be supplied to the front monitor 4 and the rear monitor 5. The intervention device 3 subsequently processes the destination search screen data such that the destination search screen fits the screen size of the front monitor 4 and rear monitor 5. The intervention device 3 then proceeds to next step SP155.

In this case, the first time the intervention device 3 accessed the front monitor 4 and the rear monitor 5, the intervention device 3 received from the front monitor 4 and the rear monitor 5 attribute data which show the screen size of the front monitor 4 and rear monitor 5, and then stored them in the nonvolatile memory 34. The intervention device 3 processes the item 501 through 508 in the destination search screen 500 such that they fit the screen size of the front monitor 4 and rear monitor 5. Therefore, the screen can be displayed in easy-to-read format.

In this manner, the intervention device 3 processes screens to fit them into the size of the front monitor 4 and rear monitor 5. The intervention device 3 may process screens in dependence upon the resolution of the front monitor 4 and rear monitor 5.

At step SP155, the intervention device 3 transmits to the front monitor 4 the destination search screen data that was processed at step SP154 for the front monitor 4, and then proceeds to next step SP156.

Figure 17:
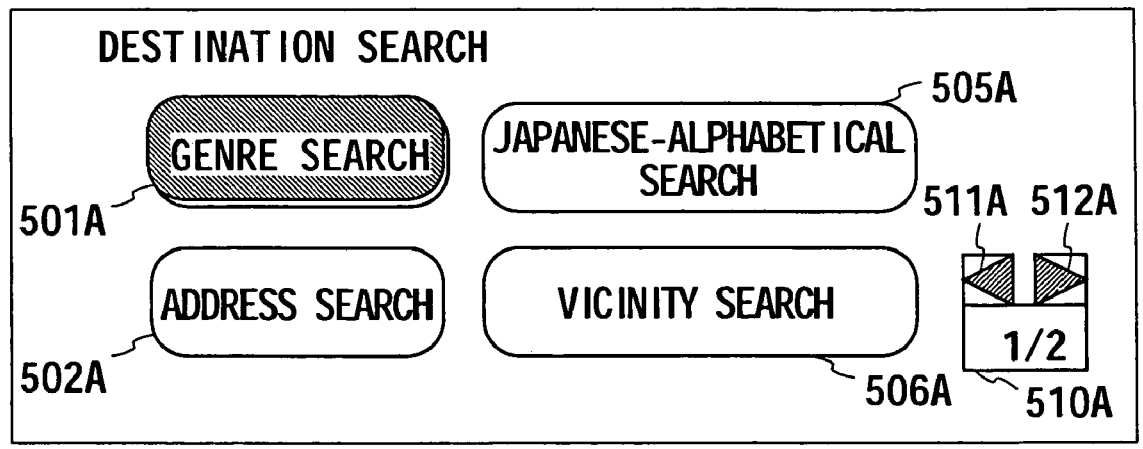
FIG. 17 is a schematic diagram showing a destination search screen which is processed based on the screen size of the front monitor.

The front monitor 4 at step SP142 displays the destination search screen 500A on the display 22 as shown in FIG. 17 based on the destination search screen data processed by the intervention device 3, and then proceeds to step SP143.

The destination search screen 500A has reduced the number of items to be displayed, which are less than those of the original destination search screen 500. The destination search screen 500A shows four items at one time; the "Genre search" item 501A, the "Address search" item 502A, the "Japanese-alphabetical search" item 505A and the "Vicinity search" item 506A.

With the size of the destination search screen 500A, only four items are displayed at one time. Therefore, the above-noted "Genre search" item 501A, "Address search" item 502A, "Japanese-alphabetical search" item 505A and "Vicinity search" item 506A are displayed on page 1/2. The rest of them are displayed on the subsequent page 2/2, when a left button 511A or right button 512A of a page changeover button 510A is pushed.

The intervention device 3 at step 156 transmits to the rear monitor 5 the destination search screen data that was processed at step SP154 for the rear monitor 5, and then proceeds to next step SP157.

Figure 18:
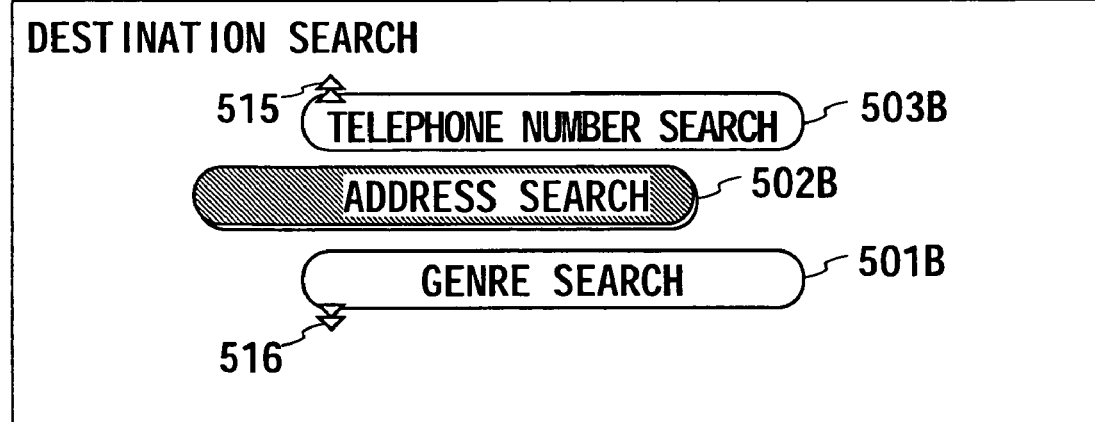
FIG. 18 is a schematic diagram showing a destination search screen which is processed based on the screen size of the rear monitor.

The rear monitor 5 at step SP132 displays the destination search screen 500B at the display 22 as shown FIG. 18 based on the destination search screen data processed by the intervention device 3, and then proceeds to next step SP133 to end the process.

The destination search screen 500B has reduced the number of items to be displayed, which are less than those of the original destination search screen 500. The destination search screen 500B shows circularly-arranged three items at one time; the "Genre search" item 501B, the "Address search" item 502B and the "Telephone number search" item 503B, for example. Other items are sequentially displayed in response to scroll operation.

The destination search screen 500B displays an upward arrow mark 515 and downward arrow mark 516 which indicate that there are other items to be displayed. Specifically, the upward arrow mark 515 indicates that upward scroll operation displays other items. The downward arrow mark 516 indicates that downward scroll operation displays other items.

At step SP143, if a user who is watching the page 1/2 of destination search screen 500A inputs some information, i.e., the user pushes the left button 511A or right button 512A of the page changeover button 510A, the front monitor 4 transmits the input information to the intervention device 3. The front monitor 4 then proceeds to next step SP144.

The intervention device 3 at step SP157 processes the existing destination search screen data in dependence upon the input information received from the front monitor 4 to generate the 2/2 page of destination search screen 500A. The intervention device 3 subsequently proceeds to next step SP158 to transmit the data of the 2/2 page of destination search screen 500A to the front monitor 4. The intervention device 3 then proceeds to step SP159 to end the process.

The front monitor 4 at step SP144 displays the 2/2 page of destination search screen (not shown) on the display 22 based on the destination search screen data of page 2/2 received from the intervention device 3, and then proceeds to next step SP145 to end the process.

As described above, the intervention device 3 has a function which emulates the processes of the navigation main unit 2. Therefore, the intervention device 3 can process the destination search screen data to fit it into the size of the front monitor 4 and rear monitor 5 in the same way as the navigation main unit 2. Accordingly, the intervention device 3 can show users the destination search screen 500A or 500B as a screen fitting to the monitor size.

(2-5) Screen-Combination Adjusting Process

Figure 19:
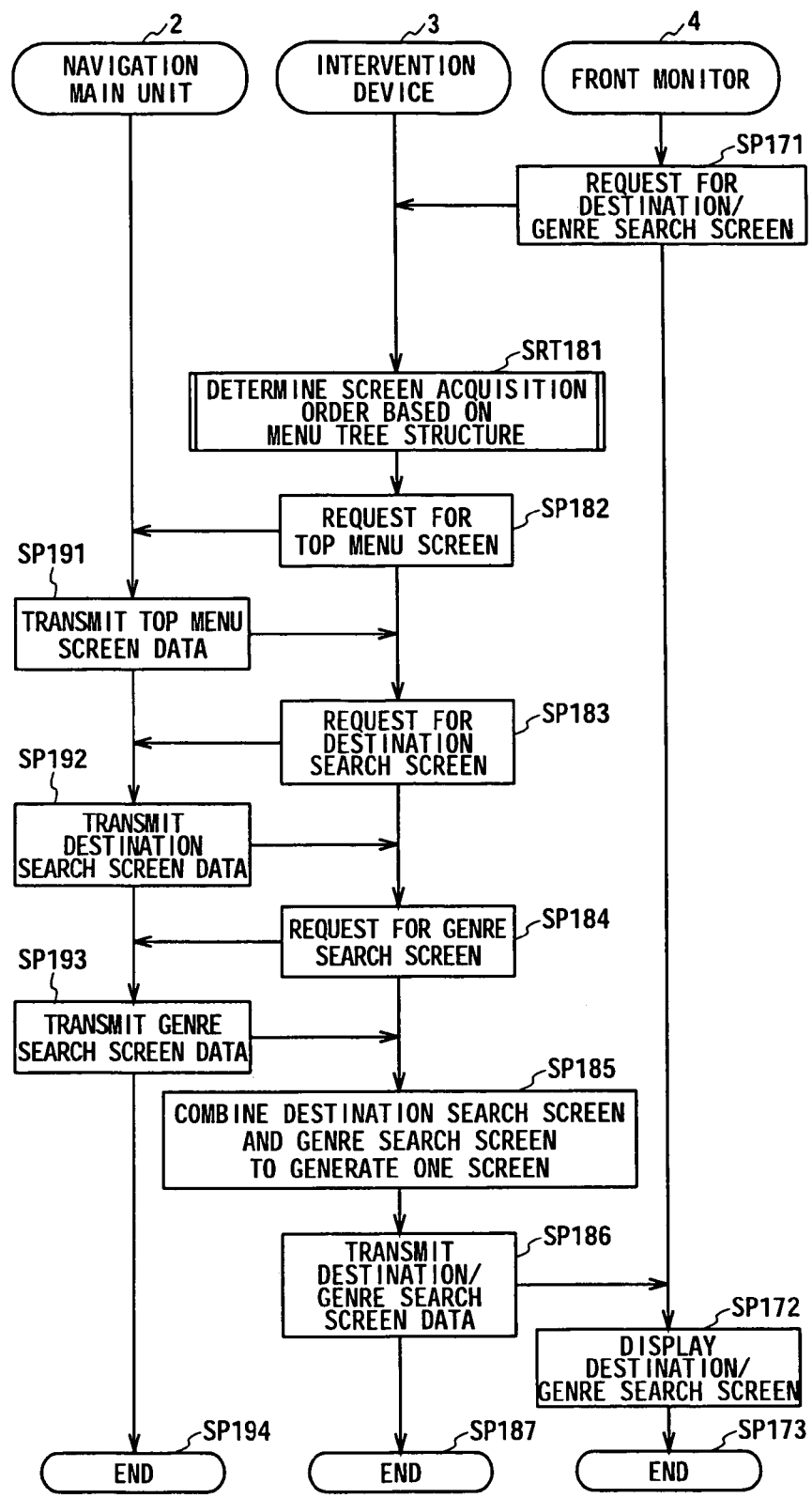
FIG. 19 is a flowchart showing a screen-combination adjusting process.

Referring to a sequence chart shown in FIG. 19, the "screen-combination adjusting process" will be described hereinafter. The intervention device 3 performs this process between the navigation main unit 2 and the front monitor 4, and the navigation main unit 2 and the rear monitor 5.

At step SP171, the front monitor 4, during displaying the top menu screen 1300 (FIG. 7), sends an acquisition request for the destination/genre search screen in response to the selection of the "Destination/Genre search" item 1305 of the top menu screen 1300. The front monitor 4 then proceeds to next step SP172.

When receiving the acquisition request for destination/genre search screen from the front monitor 4, the intervention device 3 at subroutine SRT181 respects the above-noted menu tree structure 1000 to decide a screen acquisition order. The intervention device 3 subsequently proceeds to next step SP182.

In this manner, the intervention device 3 performs the screen acquisition order determination process in the subroutine SRT181, which is the same as the screen acquisition order determination process (FIG. 13) in the above-noted subroutine SRT21. Therefore, description about it will be omitted.

In this case, the intervention device 3 can recognize that the destination/genre search screen does not exist in the menu tree structure 1000, when receiving the acquisition request for destination/genre search screen from the front monitor 4. Therefore, the intervention device 3 determines the most efficient screen acquisition order to acquire the destination search screen 500 and genre search screen 800 which are utilized to make the destination/genre search screen. The intervention device 3 then proceeds to next step SP182.

On the menu tree structure 1000, the destination search screen 500 is in a layer upper than the genre search screen 800. Therefore, the intervention device 3 requests from the navigation main unit 2 in the following order; the top menu screen 1300, the destination search screen 500, and the genre search screen 800.

At step SP182, the intervention device 3 follows the screen acquisition order determined at the subroutine SRT181 to send the acquisition requests, which is to say it first sends the acquisition request for top menu screen 1300 to the navigation main unit 2, and then proceeds to next step SP183.

At this time, the navigation main unit 2 at step SP191 reads the top menu screen data from the hard disk drive 11 in response to the acquisition request for top menu screen 1300 received from the intervention device 3. The navigation main unit 2 subsequently transmits the top menu screen data to the intervention device 3, and then proceeds to next step SP192.

At step SP183, when receiving the top menu screen data from the navigation main unit 2, the intervention device 3 sends to the navigation main unit 2 an acquisition request for the destination search screen 500 which is in a layer immediate below the top menu screen, and then proceeds to next step SP184.

The navigation main unit 2 at step SP192 reads the destination search screen data from the hard disk drive 11 in response to the acquisition request for destination search screen 500 received from the intervention device 3. The navigation main unit 2 then transmits the destination search screen data to the intervention device 3, and proceeds to next step SP193.

At step SP184, when receiving the destination search screen data from the navigation main unit 2, the intervention device 3 sends to the navigation main unit 2 an acquisition request for the genre search screen 800 which is in a layer immediate below the destination search screen 500 and will be combined with the destination search screen 500, and then proceeds to next step SP185.

The navigation main unit 2 at step SP193 reads the genre search screen data from the hard disk drive 11 in response to the acquisition request for genre search screen 800 received from the intervention device 3. The navigation main unit 2 then transmits the genre search screen data to the intervention device 3, and proceeds to next step SP194 to end the process.

Figure 20:
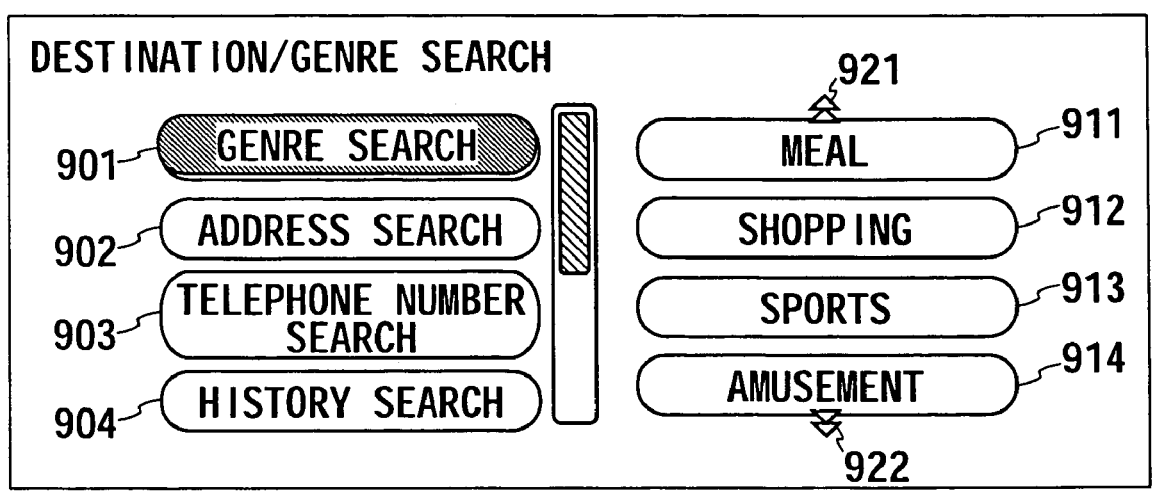
FIG. 20 is a schematic diagram showing a destination/genre search screen.

When receiving the genre search screen data from the navigation main unit 2 at step SP185, the intervention device 3 combines the destination search screen 500 and the genre search screen 800 to generate the destination/genre search screen 900 as shown in FIG. 20, and the proceeds to next step SP186.

The left area of destination/genre search screen 900 displays the "Genre search" item 901, "Address search" item 902, "Telephone number search" 903 and "History search" item 904 which are the same as a part of the destination search screen 500. For example, when the "genre search" item 901 is selected, the right area of destination/genre search screen 900 displays the "Meal" item 911, "Shopping" item 912, "Sports" item 913 and "Amusement" item 914 which are the same as the genre search screen 800 that is in a layer immediate below the "Genre search" item 901.

The destination/genre search screen 900 displays an upward arrow mark 921 and downward arrow mark 922 which indicate that there are other items to be displayed in a layer immediate below the "Genre search" item 901. Specifically, the upward arrow mark 921 indicates that upward scroll operation displays other items. The downward arrow mark 922 indicates that downward scroll operation displays other items.

At step SP186, the intervention device 3 transmits to the front monitor 4 the destination/genre search screen data forming the above-noted destination/genre search screen 900, and then proceeds to next step SP187 to end the process.

The front monitor 4 at step SP172 displays the destination/genre search screen 900 (FIG. 20) on the display 22 based on the destination/genre search screen data received from the intervention device 3, and then proceeds to next step SP173 to end the process.

As described above, the intervention device 3 has a function which emulates the processes of the navigation main unit 2. Therefore, instead of the navigation main unit 2, the intervention device 3 combines the destination search screen 500 and genre search screen 800 obtained from the navigation main unit 2 and adjusts it to generate the destination/genre search screen 900. Accordingly, even if the destination/genre search screen 900 which does not exist in the menu tree structure 1000 is requested, the intervention device 3 can supply it to the front monitor's user.

Therefore, the navigation main unit 2 which already has some kinds of screen data in the menu tree structure 1000 does not have to keep other various kinds of screen data, since the intervention device 3 can create various kinds of screen data by combining existing screen data. In this manner, the intervention device 3 can supply various kinds of screens to users.

(2-6) Filtering Adjusting Process

Figure 21:
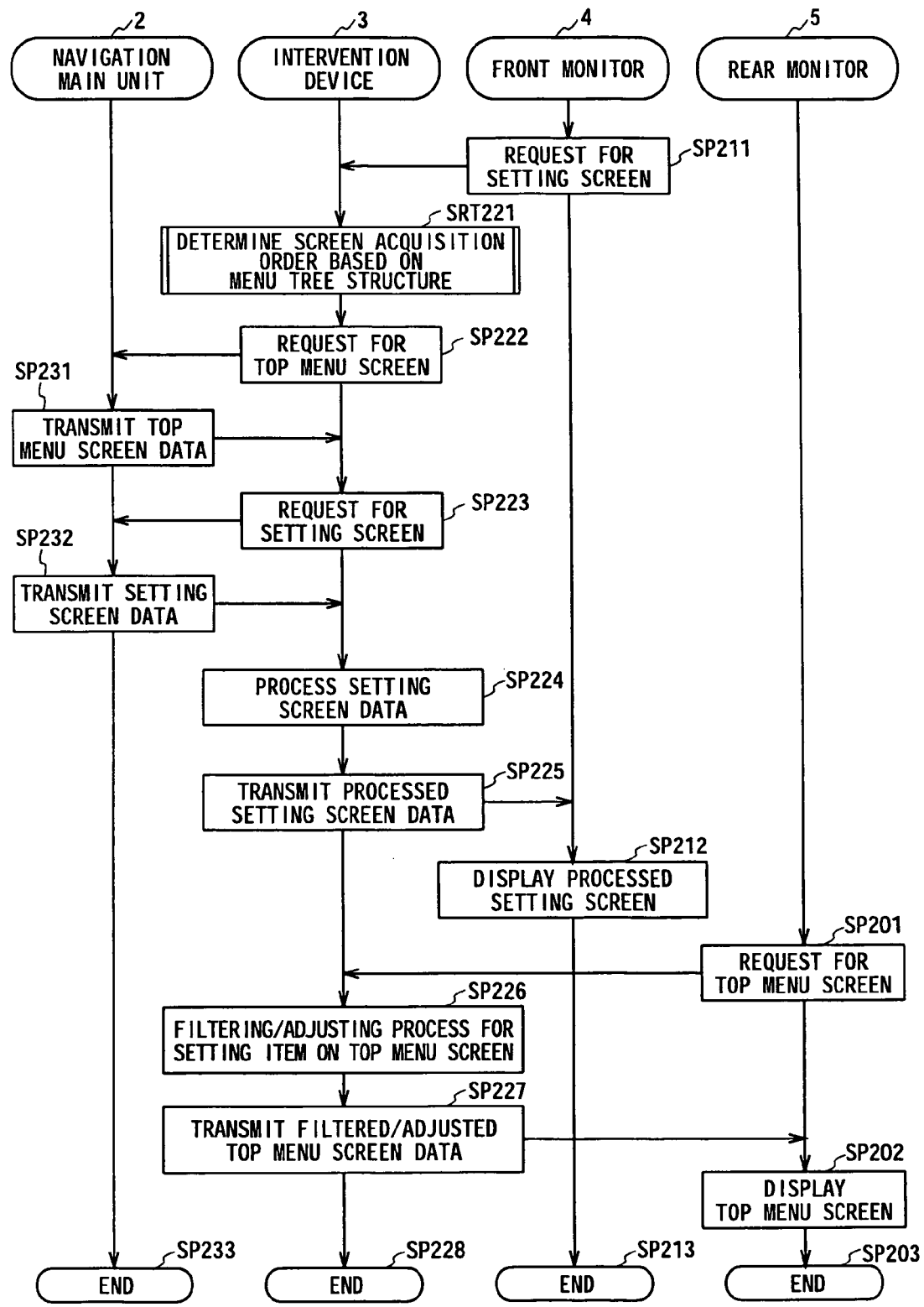
FIG. 21 is a sequence chart showing a filtering adjusting process.

Referring to a sequence chart shown in FIG. 21, the "filtering adjusting process" will be described hereinafter. The intervention device 3 performs this process between the navigation main unit 2 and the front monitor 4, and the navigation main unit 2 and the rear monitor 5.

At step SP 211, the front monitor 4, during displaying the top menu screen 1300 (FIG. 7), sends the acquisition request for setting screen 1320 to the intervention device 3 in response to the selection of the "Setting" item 1303 of the top menu screen 1300. The front monitor 4 then proceeds to next step SP212.

When receiving the acquisition request for setting screen 1320 from the front monitor 4, the intervention device 3 at subroutine SRT221 respects the above-noted menu tree structure 1000 to decide a screen acquisition order. The intervention device 3 subsequently proceeds to next step SP222.

At step SP222, the intervention device 3 follows the screen acquisition order determined at the subroutine SRT221 to send the acquisition requests, which is to say it first sends an acquisition request for the top menu screen 1300 to the navigation main unit 2, and then proceeds to next step SP223.

The navigation main unit 2 at step SP231 reads the top menu screen data from the hard disk drive 11 in response to the acquisition request for top menu screen 1300 received from the intervention device 3. The navigation main unit 2 subsequently transmits the top menu screen data to the intervention device 3, and then proceeds to next step SP232.

At step SP223, when receiving the top menu screen data from the navigation main unit 2, the intervention device 3 sends to the navigation main unit 2 an acquisition request for the setting screen 1320 which is in a layer immediate below the top menu screen, and then proceeds to step SP224.

The navigation main unit 2 at step SP232 reads the setting screen data from the hard disk drive 11 in response to the acquisition request for setting screen 1320 received from the intervention device 3. The navigation main unit 2 subsequently transmits the setting screen data to the intervention device 3, and then proceeds to next step SP233 to end the process.

The intervention device 3 at step SP224 performs data processing process and the like for the setting screen data received from the navigation main unit 2, and then proceeds to step SP225. At step SP225, the intervention device 3 transmits the processed setting screen data to the front monitor 4, and then proceeds to next step SP226.

The front monitor 4 at step SP212 displays the processed setting screen 1320 on the display 22. The front monitor 4 then accepts some kind of setting operation via the setting screen 1320, and proceeds to next step SP213 to end the process.

At this time, the rear monitor 5 at step SP201 sends an acquisition request for top menu screen 1300 to the intervention device 3, and then proceeds to next step SP202.

In the meantime, the intervention device 3 recognizes that the front monitor 4 is currently accepting some kinds of setting operation on the setting screen 1320. Therefore, the intervention device 3 at step SP226 performs filtering/adjusting process for the "Setting" item 1303 of the top menu screen 1300 such that a user in a rear-seat can not select it on the rear monitor 5, and then proceeds to next step SP227.

Figure 22:
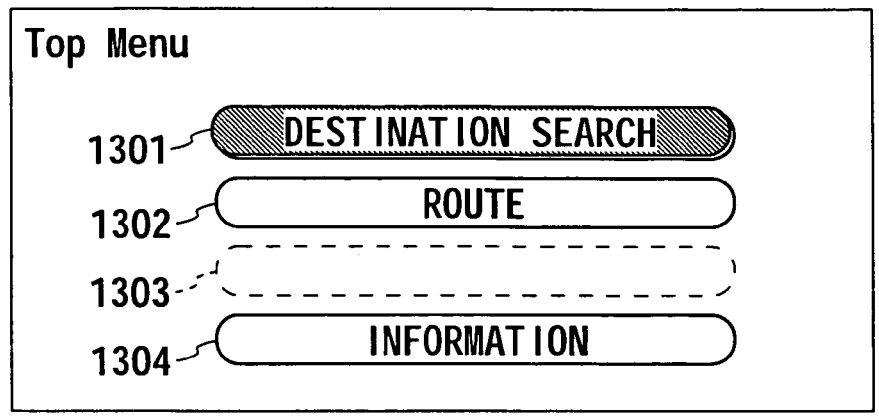
FIG. 22 is a schematic diagram showing a filtered/adjusted top menu screen.

At step SP227, the intervention device 3 transmits to the rear monitor 5 the top menu screen data representing the top menu screen 1300A (FIG. 22) in which the "Setting" item 1303 has been filtered/adjusted, and then proceeds to next step SP228 to end the process.

The rear monitor at step SP202 displays the top menu screen 1300A on the display 22 based on the filtered/adjusted top menu screen data received from the intervention device 3, and then proceeds to next step SP203 to end the process.

Figure 23:
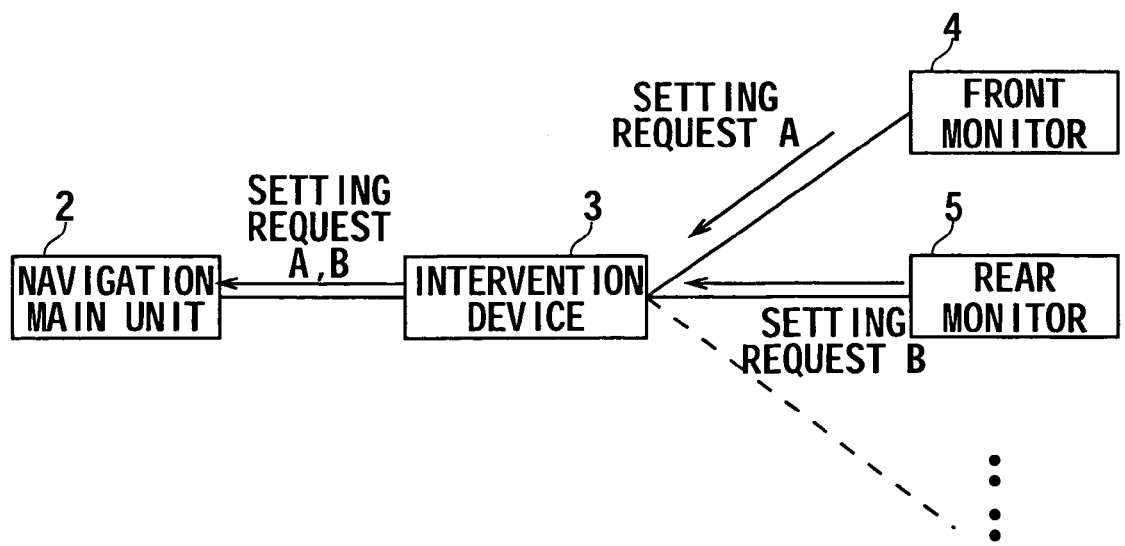
FIG. 23 is a schematic diagram for illustrating exclusive situation.

As shown in FIG. 23, if the intervention device 3 allows the rear monitor 5 to acquire the setting screen 1320 via the top menu screen 1300 during sending to the navigation main unit 2 the setting request A received from the front monitor 4 on which the setting screen 1320 is currently displayed, it may have to accept a setting request B from the rear monitor 5.

If the setting request A from the front monitor 4 is the same as the setting request B from the rear monitor 5, it causes an inconsistency, and essentially that will bring the exclusive situation in which the intervention device 3 cannot decide which monitor 4 or 5 should be set based on the setting request. In this case, before supplying the top menu screen to the rear monitor 5, the intervention device 3 performs the filtering/adjusting process for the top menu screen 1300A to make the "Setting" item 1303 un-selectable. This prevents the system from being the exclusive situation.

(3) Operation and Effect

In the configuration described above, the intervention device 3 of the vehicle navigation system 1 determines the most efficient screen acquisition order based on the menu tree structure 1000 when receiving the acquisition requests for screens from the front monitor 4 and the rear monitor 5. The intervention device 3 then follows the screen acquisition order to sequentially send the acquisition requests to the navigation main unit 2.

Specifically, If the acquisition request from the front monitor 4 requests the destination search screen 500 and the acquisition request from the rear monitor 5 requests the genre search screen 800, the intervention device 3 recognizes the fact that the destination search screen 500 is in a layer above the genre search screen 800, and therefore determine the screen acquisition order in the following order; the top menu screen 1300, the destination search screen 500, and the genre screen 800.

The intervention device 3 actually requests the top menu screen 1300 based on the screen acquisition order. However, when receiving the top menu screen 1300 from the navigation main unit 2, the intervention device 3 does not supply the screen 1300 to the front monitor 4 and the rear monitor 5.

In this manner, the intervention device 3 requests the top menu screen 1300 first based on the screen acquisition order. However, in this case, this request is pseudo-like acquisition request, as if either one of the front monitor 4 or the rear monitor 5 is requesting the top menu screen 1300, the destination search screen 500 and the genre search screen 800 in that order.

After placing the pseudo-like acquisition request for top menu screen 1300, the intervention device 3 sends the acquisition request for the destination search screen 500 to supply the screen 500 to the front monitor 4, and subsequently sends the acquisition request for the genre search screen 800 to supply the screen 800 to the rear monitor 5. Accordingly, from the perspective of the navigation main unit 2, it seems like that either one of the front monitor 4 or the rear monitor 5 is requesting the top menu screen 1300, the destination search screen 500 and the genre search screen 800 in that order. Therefore, the navigation main unit 2 can perform processes in single-sequence as it has done in the past.

Even if the intervention device 3 receives the top menu screen 1300 from the navigation main unit 2, it does not supply the screen 1300 to the front monitor 4 and the rear monitor 5. The intervention device 3 then supplies the destination search screen 500 to the front monitor 4, and supplies the genre search screen 800 to the rear monitor 5. Accordingly, from the perspective of the front monitor 4 and the rear monitor 5, it seems like that the navigation main unit 2 perform processes in multi-sequence.

The intervention device 3 also has the function that emulates the processes of the navigation main unit 2. Accordingly, instead of the navigation main unit 2, the intervention device 3 can perform the adjusting process. In the adjusting process, the intervention device 3 for example performs the screen-processing adjusting process to fit screens into the size of the front monitor 4 and rear monitor 5. The intervention device 3 also performs the combination adjusting process to combine the destination search screen 500 and the genre search screen 800 to generate the destination/genre search screen 900. Therefore, the navigation main unit 2 can perform processes in single-sequence as it has done in the past.

According to the configuration described above, the in-car navigation system 1 includes the intervention device 3 intervening between the navigation main unit 2 and the front monitor 4, and the navigation main unit 2 and the rear monitor 5. The intervention device 3 performs the mediating process or the adjusting process between the navigation main unit 2 and the front monitor 4, and the navigation main unit 2 and the rear monitor 5. This allows the navigation main unit 2 performing processes in single-sequence to be virtually multi-sequentialized, without providing the navigation main unit 2 with multi-sequence mechanism.

(4) Other Embodiments

In the above-noted embodiments, the intervention device 3 is separately provided between the navigation main unit 2 and the front monitor 4, and the navigation main unit 2 and the rear monitor 5. However, the present invention is not limited to this. The intervention device 3 and the front monitor 4 may be in one unit, and the rear monitor 5 may be connected to the intervention device 3 in the front monitor 4. Otherwise, the intervention device 3 and the navigation main unit 2 may be in one unit, and the front monitor 4 and the rear monitor 5 may be connected to the intervention device 3 in the navigation main unit 2.

In the above-noted embodiments, the intervention device 3 sends the pseudo-like acquisition request for top menu screen 1300 to the navigation main unit 2. However, the present invention is not limited to this. The intervention device 3 does not have to send the pseudo-like acquisition request for top menu screen 1300 to the navigation main unit 2, since the intervention device 3 has recognized the menu tree structure 1000.

In the above-noted embodiments, both the navigation main unit 2 and the intervention device 3 save the menu tree structure 1000 in database format. However, the present invention is not limited to this. The intervention device 3 may receive the data of menu tree structure 1000 from the navigation main unit 2. It is useful when the navigation main unit 2 changes the menu tree structure 1000.

In the above-noted embodiments, the intervention device 3 performs the above-mentioned mediating process and adjusting process based on an intervention process program. However, this invention is not limited to this. The intervention process program may be installed on the intervention device 3 by using a storage medium containing the intervention process program. Therefore, the intervention device 3 can perform the mediating process and adjusting process.

In the above-noted embodiments, the intervention device 3, which is equivalent to a navigation intervention apparatus, includes the following: the communication interface 36 which is equivalent to a request reception means; the control section 30 which is equivalent to an intervention means; and the communication interface 36 which is equivalent to an output means. However, this invention is not limited to this. The intervention device 3, which is equivalent to a navigation intervention apparatus, may have other circuitry configuration.

The navigation intervention apparatus, intervention method and in-car navigation system according to an embodiment of the present invention can be applied to change the navigation processing section which is set in single-sequence to the one virtually multi-sequentialized, for example.

It should be understood by those skilled in the art that various modifications, combinations, sub-combinations and alterations may occur depending on design requirements and other factors insofar as they are within the scope of the appended claims or the equivalents thereof.

The invention claimed is:

1. A navigation intervention apparatus comprising:
request reception means for receiving acquisition requests from a plurality of input/output sections, said acquisition requests requesting various kinds of screens from a navigation processing section, each of said input/output sections including a display section;
intervention means for performing a mediating process or an adjusting process for said various kinds of screens in response to said acquisition requests, said various kinds of screens being received from said navigation processing section and being scheduled to be output to said plurality of input/output sections; and
output means for outputting to said plurality of input/output sections the various kinds of screens for which said intervention means performed the mediating process or the adjusting process.

2. The navigation intervention apparatus according to claim 1, wherein said intervention means performs said mediating process in which said intervention means determines screen acquisition order for efficiently receiving the screens from said navigation processing section based on a hierarchical structure of said various kinds of screens, and follows said screen acquisition order to sequentially receive said various kinds of screens from said navigation processing section.

3. The navigation intervention apparatus according to claim 1, wherein said various kinds of screens consist of a destination search screen, a route information screen, a setting screen, and an information screen.

4. The navigation intervention apparatus according to claim 1, wherein said intervention means performs said adjusting process in which if said request reception means receives from said plurality of input/output sections the acquisition requests each of which requests the same screen, said intervention means receives said requested screen from said navigation processing section and performs a processing adjusting process for data of said requested screen such that said requested screen matches display formats corresponding to screen sizes or resolutions of the display sections of said plurality of input/output sections.

5. The navigation intervention apparatus according to claim 1, wherein said intervention means performs said adjusting process in which if a requested screen is not present in said navigation processing section, said intervention means receives from said navigation processing section a plurality of kinds of screens based on a hierarchical structure of said various kinds of screens and combines the received screens to generate said requested screen.

6. The navigation intervention apparatus according to claim 1, wherein said intervention means performs said adjusting process in which if an item in the screen causes an inconsistency when said output means outputs said screen corresponding to the acquisition request received from one input/output section during outputting said screen corresponding to the acquisition request received from other input/output section, the intervention means performs a filtering process for said item to make said item un-selectable.

7. An intervention method comprising:
   a request reception step of receiving acquisition requests from a plurality of input/output sections, said acquisition requests requesting various kinds of screens from a navigation processing section, each of said input/output sections including a display section;
   an intervention step of performing a mediating process or an adjusting process for said various kinds of screens in response to said acquisition requests, said various kinds of screens being received from said navigation processing section and being scheduled to be output to said plurality of input/output sections; and
   an output step of outputting to said plurality of input/output sections the various kinds of screens for which said intervention step performed the mediating process or the adjusting process.

8. A vehicle navigation system comprising:
   a navigation processing section for performing a navigation process;
   a plurality of input/output sections coupled to said navigation processing section, each of said input/output sections including a display section; and
   an intervention section intervening between said navigation processing section and said plurality of input/output sections, wherein said intervention section receives from said plurality of input/output sections acquisition requests requesting various kinds of screens from said navigation processing section, performs a mediating process or an adjusting process in response to said acquisition requests for said various kinds of screens which are received from said navigation processing section and are scheduled to be output to said plurality of input/output sections, and then outputs said various kinds of screens to said plurality of input/output sections.

9. A navigation intervention apparatus comprising:
   a request reception section for receiving acquisition requests from a plurality of input/output sections, said acquisition requests requesting various kinds of screens from a navigation processing section, each of said input/output sections including a display section;
   an intervention section for performing a mediating process or an adjusting process for said various kinds of screens in response to said acquisition requests, said various kinds of screens being received from said navigation processing section and being scheduled to be output to said plurality of input/output sections; and
   an output section for outputting to said plurality of input/output sections the various kinds of screens for which said intervention section performed the mediating process or the adjusting process.

* * * * *